United States Patent
Li et al.

(10) Patent No.: US 11,807,271 B2
(45) Date of Patent: Nov. 7, 2023

(54) METHOD, SYSTEM, AND COMPUTER PROGRAM PRODUCT FOR RESOLVING LEVEL AMBIGUITY FOR RADAR SYSTEMS OF AUTONOMOUS VEHICLES

(71) Applicant: FORD GLOBAL TECHNOLOGIES, LLC, Dearborn, MI (US)

(72) Inventors: Yinguang Li, Pittsburgh, PA (US); Xiufeng Song, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 17/390,069

(22) Filed: Jul. 30, 2021

(65) Prior Publication Data

US 2023/0030172 A1 Feb. 2, 2023

(51) Int. Cl.
*B60W 60/00* (2020.01)
*G08G 1/16* (2006.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ............. B60W 60/0015; B60W 30/09; B60W 30/0956; B60W 2420/52; B60W 2552/53; G01S 13/726; G01S 13/931; G08G 1/167
See application file for complete search history.

(56) References Cited

U.S. PATENT DOCUMENTS

| 8,390,507 | B2 | 3/2013 | Wintermantel |
| 10,713,794 | B1 * | 7/2020 | He ........................ G06N 3/084 |
(Continued)

FOREIGN PATENT DOCUMENTS

| JP | 1548458 A2 * | 12/2004 | ............... G01S 7/03 |
| JP | 2018200267 A | 12/2018 | |

OTHER PUBLICATIONS

Sharath, M. N., Nagendra R. Velaga, and Mohammed A. Quddus. "A dynamic two-dimensional (D2D) weight-based map-matching algorithm." Transportation Research Part C: Emerging Technologies 98 (2019): 409-432. (Year: 2019).*
(Continued)

*Primary Examiner* — Russell Frejd
*Assistant Examiner* — Ana D Thomas
(74) *Attorney, Agent, or Firm* — Frank MacKenzie; Brooks Kushman P.C.

(57) ABSTRACT

Methods, systems, and products for resolving level ambiguity for radar systems of autonomous vehicles may include detecting a plurality of objects with a radar system. Each first detected object may be associated with an existing tracked object based on a first position thereof. First tracked object data based on a first height determined for each first detected object may be stored. The first height may be based on the position of the detected object, the existing tracked object, and a tile map. Second tracked object data based on a second height determined for each second detected object not associated with the existing tracked object(s) may be stored. The second height may be based on a position of each second detected object, a vector map, and the tile map. A command to cause the autonomous vehicle to perform at least one autonomous driving operation may be issued.

19 Claims, 10 Drawing Sheets

(51) Int. Cl.
*G01S 13/931* (2020.01)
*B60W 30/095* (2012.01)
*B60W 30/09* (2012.01)
*G01S 13/72* (2006.01)

(52) U.S. Cl.
CPC ............ *G01S 13/72* (2013.01); *G01S 13/931* (2013.01); *G08G 1/167* (2013.01); *B60W 2420/52* (2013.01); *B60W 2552/53* (2020.02)

(56) References Cited

U.S. PATENT DOCUMENTS

| | | |
|---|---|---|
| 2017/0023678 A1 | 1/2017 | Pink et al. |
| 2017/0185089 A1 | 6/2017 | Mei et al. |
| 2018/0342160 A1 | 11/2018 | Komori et al. |
| 2018/0364717 A1 | 12/2018 | Douillard et al. |
| 2020/0191936 A1 | 6/2020 | Witter et al. |
| 2021/0157321 A1* | 5/2021 | Wang ..................... G01S 7/4808 |
| 2022/0083841 A1* | 3/2022 | Isele ....................... G01S 17/89 |
| 2022/0393341 A1* | 12/2022 | Shams .................. G01S 13/931 |
| 2023/0003871 A1* | 1/2023 | Qian ..................... G06N 20/00 |

OTHER PUBLICATIONS

Shen, Tzu C., and Andres Guesalaga. "Map-Matching of Radar Images and Electronic Charts Using the Hausdorff Distance." ICINCO (3). 2004. (Year: 2001).*

Novak, L. M. "Radar target detection and map-matching algorithm studies." IEEE Transactions on Aerospace and Electronic Systems 5 (1980): 620-625. (Year: 1980).*

Diewald et al., "Radar-Interference-Based Bridge Identification for Collision Avoidance Systems", 2011 IEEE Intelligent Vehicles Symposium (IV), Jun. 5-9, 2011, pp. 113-118.

* cited by examiner

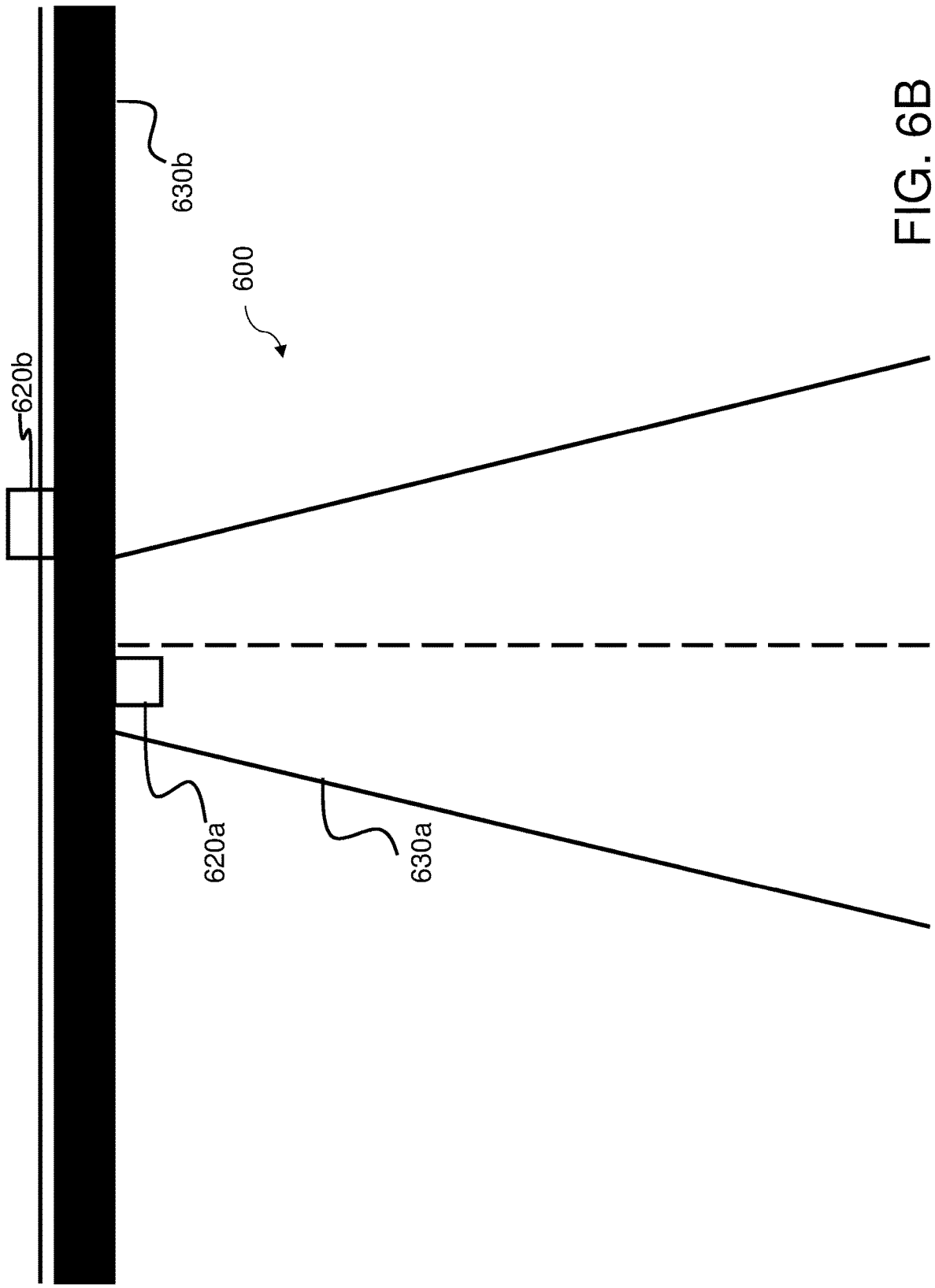

METHOD, SYSTEM, AND COMPUTER PROGRAM PRODUCT FOR RESOLVING LEVEL AMBIGUITY FOR RADAR SYSTEMS OF AUTONOMOUS VEHICLES

BACKGROUND

1. Field

This disclosed subject matter relates generally to methods, systems, and products for resolving level ambiguity for radar systems and, in some particular embodiments or aspects, to a method, system, and computer program product for resolving level ambiguity for radar systems of autonomous vehicles.

2. Technical Considerations

Certain radar systems may have relatively good resolution in one plane (e.g., a horizontal plane) but relatively poor resolution in another plane orthogonal thereto (e.g., a vertical plane). For example, when a radar system is oriented in a horizontal plane, the beamwidth (e.g., 3-dB beamwidth) in the vertical plane may be about 10°, so the resolution for elevation of detected objects may be poor.

When a detected object is on a single-level roadway, a radar system may be sufficient for an autonomous vehicle to detect the position of the object. However, when a detected object is on a multi-level roadway (e.g., an overpass, a bridge, a tunnel, a ramp, an interchange, a junction, and/or the like), it may be difficult or impossible for a radar system to determine the level on which the detected object is located. If the ambiguity with respect to the level on which the detected object is located is not resolved, the autonomous vehicle may incorrectly determine the detected object is on a wrong level. This inaccuracy could lead to undesirable or even dangerous behavior of the autonomous vehicle. For example, if an autonomous vehicle erroneously determines that an object is on the same level as the autonomous vehicle, this misdetection may result in a false alarm that causes the autonomous vehicle to behave erratically. If the autonomous vehicle erroneously determines that an object is on a different level as the autonomous vehicle, this misdetection may result in a collision.

SUMMARY

Accordingly, it is an object of the presently disclosed subject matter to provide methods, systems, and computer program products for resolving level ambiguity for radar systems, e.g., for autonomous vehicles, that overcome some or all of the deficiencies identified above.

According to non-limiting embodiments or aspects, provided is a method for resolving level ambiguity for radar systems of autonomous vehicles. In some non-limiting embodiments or aspects, a method for resolving level ambiguity for radar systems of autonomous vehicles may include detecting a plurality of detected objects with a radar system of an autonomous vehicle. Each first detected object of at least one first detected object of the plurality of detected objects may be associated with a respective existing tracked object of at least one existing tracked object based on a first position of each first detected object. First tracked object data based on a first height determined for each first detected object associated with each respective existing tracked object may be stored. The first height of each first detected object may be based on the first position of the first detected object, the respective existing tracked object, and a tile map. Second tracked object data based on a second height determined for each second detected object may be stored. The second height of each second detected object of at least one second detected object of the plurality of detected objects not associated with the at least one existing tracked object may be based on a second position of each second detected object, a vector map, and the tile map. A command to cause the autonomous vehicle to perform at least one autonomous driving operation may be issued. The command may be based on the first tracked object data and the second tracked object data.

In some non-limiting embodiments or aspects, the radar system may include a two-dimensional (2D) radar system.

In some non-limiting embodiments or aspects, associating each first detected object with the respective existing tracked object may include associating each first detected object with the respective existing tracked object based on a nearest neighbor search.

In some non-limiting embodiments or aspects, associating each first detected object with the respective existing tracked object may include, in response to determining that a cost score for each first detected object and the respective existing tracked object satisfies a threshold, associating the first detected object and the respective existing tracked object. Additionally or alternatively, the cost score for each first detected object and the respective existing tracked object may be based on the first position of the first detected object, an existing position of the existing tracked object, a first velocity of the first detected object, and an existing velocity of the existing tracked object.

In some non-limiting embodiments or aspects, the first height of each first detected object may be determined by querying the tile map based on the first position of the first detected object to provide a plurality of ground heights and determining a first ground height of the plurality of ground heights closest to an existing height of the respective existing tracked object as the first height of the first detected object.

In some non-limiting embodiments or aspects, the second height of each second detected object may be determined by querying the tile map based on the second position of the second detected object to provide a plurality of ground heights and a first set of tile indices. A first lane segment of a plurality of lane segments may be selected based on a cost score for each respective lane segment of the plurality of lane segments. The plurality of lane segments may be based on a vector map corresponding the second position of the second detected object. The cost score for each respective lane segment of the plurality of lane segments may be based on the second position of the second detected object, a respective center of the respective lane segment, a direction of motion of the second detected object, and a lane orientation of the respective lane segment. A second set of tile indices associated with the first lane segment may be compared with the first set of tile indices to determine whether the second set of tile indices matches the first set of tile indices. In response to determining that the second set of tile indices matches the first set of tile indices, a first ground height of the plurality of ground heights associated with the second set of tile indices may be selected as the second height of the second detected object, or, in response to determining that the second set of tile indices does not match the first set of tile indices, a height of the autonomous vehicle may be selected as the second height of the second detected object.

In some non-limiting embodiments or aspects, the first tracked object data may include the at least one first detected object and the first height determined for each first detected object.

In some non-limiting embodiments or aspects, the first tracked object data may include update data for the at least one existing tracked object based on the first height and the at least one first detected object. Storing the first tracked object data may include communicating the update data to a tracked object storage system.

In some non-limiting embodiments or aspects, the second tracked object data may include the at least one second detected object and the second height determined for each second detected object.

In some non-limiting embodiments or aspects, the second tracked object data may include initiation data for initiating tracking of the at least one second detected object based on the second height and the at least one second detected object. Storing the second tracked object data may include communicating the initiation data to a tracked object storage system.

In some non-limiting embodiments or aspects, existing tracked object data associated with the at least one existing tracked object may be at least one of updated, added to, or replaced based on the first tracked object data and the second tracked object data.

In some non-limiting embodiments or aspects, a plurality of tracked objects may include the at least one first detected object and the at least one second detected object. A plurality of further detected objects may be detected with the radar system of the autonomous vehicle. Each first further detected object of at least one first further detected object of the plurality of further detected objects may be associated with a respective tracked object of the plurality of tracked objects based on a first further position of each first further detected object. First further tracked object data based on a first further height determined for each first further detected object associated with each respective tracked object may be stored. The first further height of each first further detected object may be based on the first further position of the first further detected object, the respective tracked object, and the tile map. Second further tracked object data based on a second further height determined for each second further detected object may be stored. The second height of each second further detected object of at least one second further detected object of the plurality of further detected objects not associated with the plurality of tracked objects may be based on a second further position of each second further detected object, the vector map, and the tile map. A further command may be issued to cause the autonomous vehicle to perform at least one further autonomous driving operation. The further command may be based on the first further tracked object data and the second further tracked object data.

In some non-limiting embodiments or aspects, the plurality of tracked objects may be replaced with the at least one first further detected object and the at least one second further detected object. Detecting the plurality of further detected objects, associating each first further detected object with the respective tracked object of the plurality of tracked objects, storing the first further tracked object data, storing the second further tracked object data, and issuing the further command may be repeated continuously while the autonomous vehicle is operating.

In some non-limiting embodiments or aspects, the at least one autonomous driving operation may include controlling at least one of braking, steering, or acceleration of the autonomous vehicle to avoid one or more of the at least one first detected object or the at least one second detected object based on at least one of the first height determined for the at least one first detected object or the second height determined for the at least one second detected object, respectively.

According to non-limiting embodiments or aspects, provided is a system for resolving level ambiguity for radar systems of autonomous vehicles. In some non-limiting embodiments or aspects, a system for resolving level ambiguity for radar systems of autonomous vehicles may include a radar detection system configured to detect a plurality of detected objects with a radar system of an autonomous vehicle and communicate detected object data associated with the plurality of detected objects. A radar data association system may be configured to receive the detected object data; receive existing tracked object data associated with at least one existing tracked object; associate each first detected object of at least one first detected object of the plurality of detected objects with a respective existing tracked object of the at least one existing tracked object based on a first position of each first detected object; communicate first tracked object data based on a first height determined for each first detected object associated with each respective existing tracked object, the first height of each first detected object being based on the first position of the first detected object, the respective existing tracked object, and a tile map; and communicate at least a portion of the detected object data associated with at least one second detected object of the plurality of detected objects not associated with the at least one existing tracked object. A tracking initiation system may be configured to receive the at least the portion of the detected object data associated with the at least one second detected object of the plurality of detected objects not associated with the at least one existing tracked object and communicate second tracked object data based on a second height determined for each second detected object, the second height of each second detected object of the at least one second detected object being based on a second position of each second detected object, a vector map, and the tile map. A tracked object storage system may be configured to receive and store the first tracked object data and the second tracked object data. A vehicle on-board computing device may be configured to issue a command to cause the autonomous vehicle to perform at least one autonomous driving operation. The command may be based on the first tracked object data and the second tracked object data.

In some non-limiting embodiments or aspects, the first height of each first detected object may be determined by querying the tile map based on the first position of the first detected object to provide a plurality of ground heights and determining a first ground height of the plurality of ground heights closest to an existing height of the respective existing tracked object as the first height of the first detected object.

In some non-limiting embodiments or aspects, the second height of each second detected object may be determined by querying the tile map based on the second position of the second detected object to provide a plurality of ground heights and a first set of tile indices. A first lane segment of a plurality of lane segments may be selected based on a cost score for each respective lane segment of the plurality of lane segments. The plurality of lane segments may be based on a vector map corresponding to the second position of the second detected object. The cost score for each respective lane segment of the plurality of lane segments may be based on the second position of the second detected object, a respective center of the respective lane segment, a direction of motion of the second detected object, and a lane orientation of the respective lane segment. A second set of tile indices associated with the first lane segment may be compared with the first set of tile indices to determine whether the second set of tile indices matches the first set of tile indices. In response to determining that the second set of tile indices matches the first set of tile indices, a first ground height of the plurality of ground heights associated with the second set of tile indices may be selected as the second height of the second detected object, or, in response to determining that the second set of tile indices does not match the first set of tile indices, a height of the autonomous vehicle may be selected as the second height of the second detected object.

According to non-limiting embodiments or aspects, provided is a computer program product for resolving level ambiguity for radar systems of autonomous vehicles. In some non-limiting embodiments or aspects, a computer program product for resolving level ambiguity for radar systems of autonomous vehicles may include at least one non-transitory computer-readable medium including one or more instructions that, when executed by at least one processor, cause the at least one processor to detect a plurality of detected objects with a radar system of an autonomous vehicle; associate each first detected object of at least one first detected object of the plurality of detected objects with a respective existing tracked object of at least one existing tracked object based on a first position of each first detected object; store first tracked object data based on a first height determined for each first detected object associated with each respective existing tracked object, the first height of each first detected object being based on the first position of the first detected object, the respective existing tracked object, and a tile map; store second tracked object data based on a second height determined for each second detected object, the second height of each second detected object of at least one second detected object of the plurality of detected objects not associated with the at least one existing tracked object being based on a second position of each second detected object, a vector map, and the tile map; and issue a command to cause the autonomous vehicle to perform at least one autonomous driving operation, the command being based on the first tracked object data and the second tracked object data.

In some non-limiting embodiments or aspects, the first height of each first detected object may be determined by querying the tile map based on the first position of the first detected object to provide a plurality of ground heights and determining a first ground height of the plurality of ground heights closest to an existing height of the respective existing tracked object as the first height of the first detected object.

In some non-limiting embodiments or aspects, the second height of each second detected object may be determined by querying the tile map based on the second position of the second detected object to provide a plurality of ground heights and a first set of tile indices. A first lane segment of a plurality of lane segments may be selected based on a cost score for each respective lane segment of the plurality of lane segments. The plurality of lane segments may be based on a vector map corresponding the second position of the second detected object. The cost score for each respective lane segment of the plurality of lane segments may be based on the second position of the second detected object, a respective center of the respective lane segment, a direction of motion of the second detected object, and a lane orientation of the respective lane segment. A second set of tile indices associated with the first lane segment may be compared with the first set of tile indices to determine whether the second set of tile indices matches the first set of tile indices. In response to determining that the second set of tile indices matches the first set of tile indices, a first ground height of the plurality of ground heights associated with the second set of tile indices may be selected as the second height of the second detected object, or, in response to determining that the second set of tile indices does not match the first set of tile indices, a height of the autonomous vehicle may be selected as the second height of the second detected object.

Further embodiments or aspects are set forth in the following numbered clauses:

Clause 1: A method for resolving level ambiguity for radar systems of autonomous vehicles, comprising: detecting, with at least one processor, a plurality of detected objects with a radar system of an autonomous vehicle; associating, with the at least one processor, each first detected object of at least one first detected object of the plurality of detected objects with a respective existing tracked object of at least one existing tracked object based on a first position of each first detected object; storing, with the at least one processor, first tracked object data based on a first height determined for each first detected object associated with each respective existing tracked object, the first height of each first detected object being based on the first position of the first detected object, the respective existing tracked object, and a tile map; storing, with the at least one processor, second tracked object data based on a second height determined for each second detected object, the second height of each second detected object of at least one second detected object of the plurality of detected objects not associated with the at least one existing tracked object being based on a second position of each second detected object, a vector map, and the tile map; and issuing, with the at least one processor, a command to cause the autonomous vehicle to perform at least one autonomous driving operation, the command being based on the first tracked object data and the second tracked object data.

Clause 2: The method of clause 1, wherein the radar system comprises a two-dimensional (2D) radar system.

Clause 3: The method of any preceding clause, wherein associating each first detected object with the respective existing tracked object comprises associating, with the at least one processor, each first detected object with the respective existing tracked object based on a nearest neighbor search.

Clause 4: The method of any preceding clause, wherein associating each first detected object with the respective existing tracked object comprises: in response to determining that a cost score for each first detected object and the respective existing tracked object satisfies a threshold, associating the first detected object and the respective existing tracked object, wherein the cost score for each first detected object and the respective existing tracked object is based on the first position of the first detected object, an existing position of the existing tracked object, a first velocity of the first detected object, and an existing velocity of the existing tracked object.

Clause 5: The method of any preceding clause, wherein the first height of each first detected object is determined by: querying, with the at least one processor, the tile map based on the first position of the first detected object to provide a plurality of ground heights; and determining, with the at least one processor, a first ground height of the plurality of ground heights closest to an existing height of the respective existing tracked object as the first height of the first detected object.

Clause 6: The method of any preceding clause, wherein the second height of each second detected object is determined by: querying, with the at least one processor, the tile map based on the second position of the second detected object to provide a plurality of ground heights and a first set of tile indices; selecting, with the at least one processor, a first lane segment of a plurality of lane segments based on a cost score for each respective lane segment of the plurality of lane segments, wherein the plurality of lane segments is based on a vector map corresponding the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment; comparing, with the at least one processor, a second set of tile indices associated with the first lane segment with the first set of tile indices to determine whether the second set of tile indices matches the first set of tile indices; and one of: in response to determining that the second set of tile indices matches the first set of tile indices, selecting, with the at least one processor, a first ground height of the plurality of ground heights associated with the second set of tile indices as the second height of the second detected object; or in response to determining that the second set of tile indices does not match the first set of tile indices, selecting, with the at least one processor, a height of the autonomous vehicle as the second height of the second detected object.

Clause 7: The method of any preceding clause, wherein the first tracked object data comprises the at least one first detected object and the first height determined for each first detected object.

Clause 8: The method of any preceding clause, wherein the first tracked object data comprises update data for the at least one existing tracked object based on the first height and the at least one first detected object, and wherein storing the first tracked object data comprises communicating, with the at least one processor, the update data to a tracked object storage system.

Clause 9: The method of any preceding clause, wherein the second tracked object data comprises the at least one second detected object and the second height determined for each second detected object.

Clause 10: The method of any preceding clause, wherein the second tracked object data comprises initiation data for initiating tracking of the at least one second detected object based on the second height and the at least one second detected object, and wherein storing the second tracked object data comprises communicating, with the at least one processor, the initiation data to a tracked object storage system.

Clause 11: The method of any preceding clause, wherein existing tracked object data associated with the at least one existing tracked object is at least one of updated, added to, or replaced based on the first tracked object data and the second tracked object data.

Clause 12: The method of any preceding clause, wherein a plurality of tracked objects comprises the at least one first detected object and the at least one second detected object, the method further comprising: detecting, with the at least one processor, a plurality of further detected objects with the radar system of the autonomous vehicle; associating, with the at least one processor, each first further detected object of at least one first further detected object of the plurality of further detected objects with a respective tracked object of the plurality of tracked objects based on a first further position of each first further detected object; storing, with the at least one processor, first further tracked object data based on a first further height determined for each first further detected object associated with each respective tracked object, the first further height of each first further detected object being based on the first further position of the first further detected object, the respective tracked object, and the tile map; storing, with the at least one processor, second further tracked object data based on a second further height determined for each second further detected object, the second height of each second further detected object of at least one second further detected object of the plurality of further detected objects not associated with the plurality of tracked objects being based on a second further position of each second further detected object, the vector map, and the tile map; and issuing, with the at least one processor, a further command to cause the autonomous vehicle to perform at least one further autonomous driving operation, the further command being based on the first further tracked object data and the second further tracked object data.

Clause 13: The method of any preceding clause, further comprising: replacing, with the at least one processor, the plurality of tracked objects with the at least one first further detected object and the at least one second further detected object; and repeating, with the at least one processor, detecting the plurality of further detected objects, associating each first further detected object with the respective tracked object of the plurality of tracked objects, storing the first further tracked object data, storing the second further tracked object data, and issuing the further command continuously while the autonomous vehicle is operating.

Clause 14: The method of any preceding clause, wherein the at least one autonomous driving operation comprises controlling, with the at least one processor, at least one of braking, steering, or acceleration of the autonomous vehicle to avoid at least one of the at least one first detected object or the at least one second detected object based on at least one of the first height determined for the at least one first detected object or the second height determined for the at least one second detected object, respectively.

Clause 15: A system for resolving level ambiguity for radar systems of autonomous vehicles, comprising: a radar detection system configured to: detect a plurality of detected objects with a radar system of an autonomous vehicle; and communicate detected object data associated with the plurality of detected objects; a radar data association system configured to: receive the detected object data; receive existing tracked object data associated with at least one existing tracked object; associate each first detected object of at least one first detected object of the plurality of detected objects with a respective existing tracked object of the at least one existing tracked object based on a first position of each first detected object; communicate first tracked object data based on a first height determined for each first detected object associated with each respective existing tracked object, the first height of each first detected object being based on the first position of the first detected object, the respective existing tracked object, and a tile map; and communicate at least a portion of the detected object data associated with at least one second detected object of the plurality of detected objects not associated with the at least one existing tracked object; a tracking initiation system configured to: receive the at least the portion of the detected object data associated with the at least one second detected object of the plurality of detected objects not associated with the at least one existing tracked object; and communicate second tracked object data based on a second height determined for each second detected object, the second height of each second detected object of the at least one second detected object being based on a second position of each second detected object, a vector map, and the tile map; a tracked object storage system configured to: receive and store the first tracked object data and the second tracked object data; and a vehicle on-board computing device configured to: issue a command to cause the autonomous vehicle to perform at least one autonomous driving operation, the command being based on the first tracked object data and the second tracked object data.

Clause 16: The system of clause 15, wherein the first height of each first detected object is determined by: querying the tile map based on the first position of the first detected object to provide a plurality of ground heights; and determining a first ground height of the plurality of ground heights closest to an existing height of the respective existing tracked object as the first height of the first detected object.

Clause 17: The system of one of clauses 15 or 16, wherein the second height of each second detected object is determined by: querying the tile map based on the second position of the second detected object to provide a plurality of ground heights and a first set of tile indices; selecting a first lane segment of a plurality of lane segments based on a cost score for each respective lane segment of the plurality of lane segments, wherein the plurality of lane segments is based on a vector map corresponding to the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment; comparing a second set of tile indices associated with the first lane segment with the first set of tile indices to determine whether the second set of tile indices matches the first set of tile indices; and one of: in response to determining that the second set of tile indices matches the first set of tile indices, selecting a first ground height of the plurality of ground heights associated with the second set of tile indices as the second height of the second detected object; or in response to determining that the second set of tile indices does not match the first set of tile indices, selecting a height of the autonomous vehicle as the second height of the second detected object.

Clause 18: A computer program product for resolving level ambiguity for radar systems of autonomous vehicles, the computer program product comprising at least one non-transitory computer-readable medium comprising one or more instructions that, when executed by at least one processor, cause the at least one processor to: detect a plurality of detected objects with a radar system of an autonomous vehicle; associate each first detected object of at least one first detected object of the plurality of detected objects with a respective existing tracked object of at least one existing tracked object based on a first position of each first detected object; store first tracked object data based on a first height determined for each first detected object associated with each respective existing tracked object, the first height of each first detected object being based on the first position of the first detected object, the respective existing tracked object, and a tile map; store second tracked object data based on a second height determined for each second detected object, the second height of each second detected object of at least one second detected object of the plurality of detected objects not associated with the at least one existing tracked object being based on a second position of each second detected object, a vector map, and the tile map; and issue a command to cause the autonomous vehicle to perform at least one autonomous driving operation, the command being based on the first tracked object data and the second tracked object data.

Clause 19: The computer program product of clause 18, wherein the first height of each first detected object is determined by: querying the tile map based on the first position of the first detected object to provide a plurality of ground heights; and determining a first ground height of the plurality of ground heights closest to an existing height of the respective existing tracked object as the first height of the first detected object.

Clause 20: The computer program product of one of clauses 18 or 19, wherein the second height of each second detected object is determined by: querying the tile map based on the second position of the second detected object to provide a plurality of ground heights and a first set of tile indices; selecting a first lane segment of a plurality of lane segments based on a cost score for each respective lane segment of the plurality of lane segments, wherein the plurality of lane segments is based on a vector map corresponding the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment; comparing a second set of tile indices associated with the first lane segment with the first set of tile indices to determine whether the second set of tile indices matches the first set of tile indices; and one of: in response to determining that the second set of tile indices matches the first set of tile indices, selecting a first ground height of the plurality of ground heights associated with the second set of tile indices as the second height of the second detected object; or in response to determining that the second set of tile indices does not match the first set of tile indices, selecting a height of the autonomous vehicle as the second height of the second detected object.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIGS. 6A and 6B are diagrams of an exemplary scenario in which a non-limiting embodiment or aspect of the process shown in FIG. 5 may be implemented according to the principles of the presently disclosed subject matter;

DESCRIPTION

Figure 1:
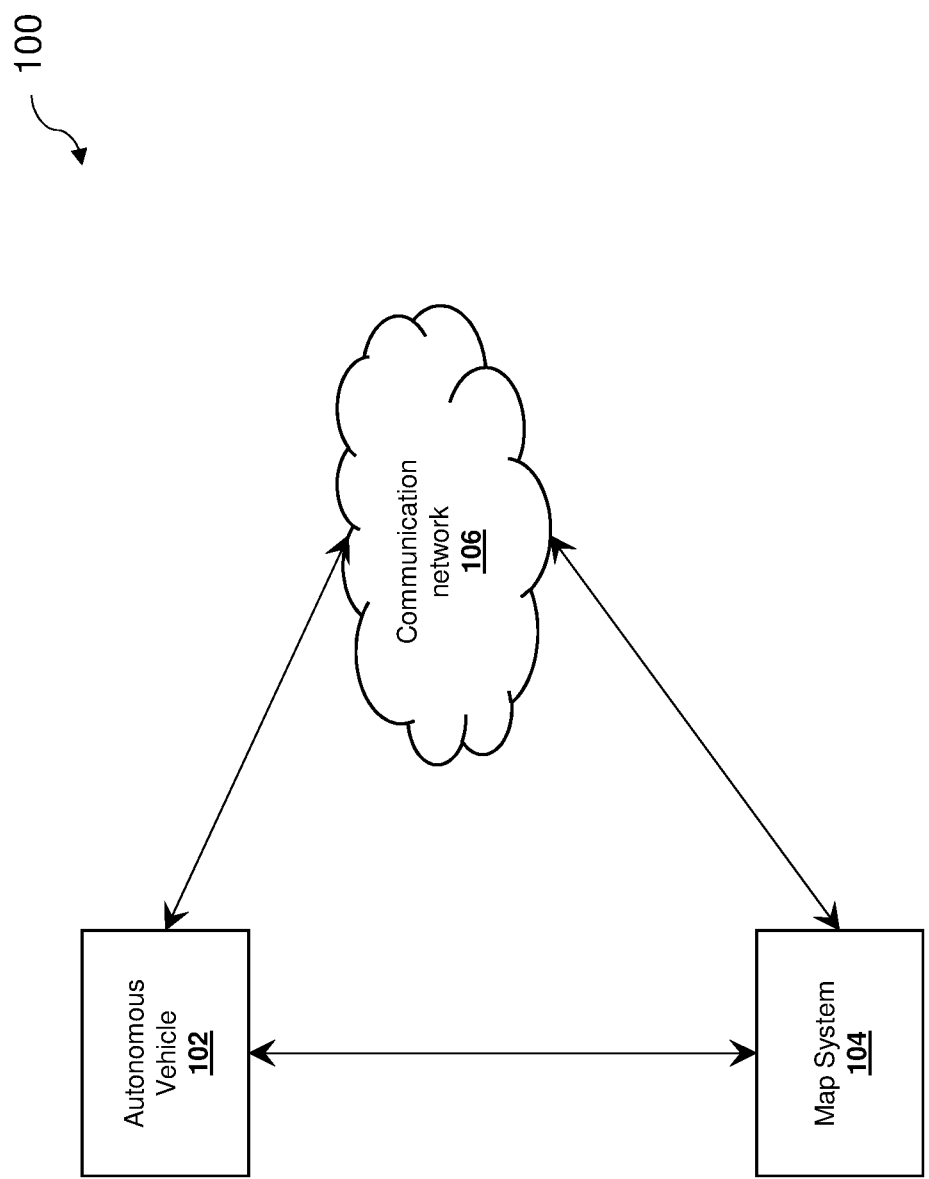
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Non-limiting embodiments or aspects of the disclosed subject matter are directed to systems, methods, and computer program products for resolving level ambiguity for radar systems of autonomous vehicles. For example, non-limiting embodiments or aspects of the disclosed subject matter provide selectively associating a (e.g., first) detected object with an existing tracked object to determine a height thereof based on the existing tracked object and a tile map and, separately or alternatively, determining the height of an unassociated (e.g., second) detected object based on the tile map and a vector map. Such embodiments or aspects provide techniques and systems that enable accurate determination of the level of a detected object in a multi-level roadway. Additionally or alternatively, such embodiments or aspects provide techniques and systems that allow for using the (e.g., horizontal) position determined by radar with the combination of level information (e.g., ground heights) from a tile map and at least one additional piece of knowledge (e.g., an existing tracked object with an existing height or a vector map with level identifiers) to resolve the level (e.g., height) of a detected object in a multi-level roadway. Further non-limiting embodiments or aspects of the disclosed subject matter provide issuing a command to cause the autonomous vehicle to perform at least one autonomous driving operation based on the level(s) determined for the detected object(s). Such embodiments or aspects provide techniques and systems that enable an autonomous vehicle to control driving operations (e.g., steering, braking, accelerating, etc.) appropriately when one or more objects are detected in a multi-level roadway based on the accurate level/height detected for each respective object. As such, the autonomous vehicle avoids undesirable or dangerous behavior based on misdetection of the level/height of the detected objects.

For the purpose of illustration, in the following description, while the presently disclosed subject matter is described with respect to methods, systems, and computer program products for resolving level ambiguity, e.g., for radar systems of autonomous vehicles, one skilled in the art will recognize that the disclosed subject matter is not limited to the illustrative embodiments or aspects. For example, the methods, systems, and computer program products described herein may be used with a wide variety of settings, such as resolving ambiguity of coordinates in any setting in which devices provide accurate detection of coordinates in some dimensions but not others, e.g., navigation, mapping, image processing, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 may include autonomous vehicle 102, map system 104, and/or communication network 106.

Autonomous vehicle 102 may include one or more devices capable of receiving information from and/or communicating information to map system 104 (e.g., directly, indirectly via communication network 106, and/or any other suitable communication technique). Additionally or alternatively, each autonomous vehicle 102 may include a device capable of receiving information from and/or communicating information to other autonomous vehicles 102 (e.g., directly, indirectly via communication network 106, and/or any other suitable communication technique). In some non-limiting embodiments or aspects, autonomous vehicle 102 may include at least one computing device, such as a vehicle on-board computing device, a portable and/or handheld device (e.g., a computer, a laptop, a personal digital assistant (PDA), a smartphone, a tablet, and/or the like), a server, and/or other like devices. In some non-limiting embodiments or aspects, autonomous vehicle 102 may include a vehicle, as described herein. For example, the vehicle may include at least one computing device (e.g., a vehicle on-board computing device) and at least one sensor (e.g., a ray casting system such as a LiDAR, a laser scanner, a radar, any combination thereof, and/or the like; an image capture system such as a camera and/or the like; any combination thereof, and/or the like), as described herein. In some non-limiting embodiments or aspects, autonomous vehicle 102 (e.g., the computing device thereof and/or the like) may be configured to generate map data based on the sensor(s). Additionally or alternatively, the vehicle (e.g., autonomous vehicle 102) may obtain (e.g., receive, retrieve, and/or the like) map data associated with at least one map of at least one geographic location (e.g., a geographic location including a roadway) from map system 104, as described herein. In some non-limiting embodiments or aspects, autonomous vehicle 102 may use the map data to facilitate at least one autonomous driving operation of the autonomous vehicle 102, as described herein. In some non-limiting embodiments or aspects, autonomous vehicle 102 may detect at least one object using the sensor(s) onboard the vehicle. For example, autonomous vehicle 102 may detect the object(s) using a radar, as described herein. Additionally or alternatively, autonomous vehicle 102 may track the object(s) and/or use data associated with the object(s) to issue a command to cause the autonomous vehicle 102 to perform at least one autonomous driving operation, as described herein.

Map system 104 may include one or more devices capable of receiving information from and/or communicating information to autonomous vehicle 102 (e.g., directly, indirectly via communication network 106, and/or any other suitable communication technique). In some non-limiting embodiments or aspects, map system 104 may include at least one computing device, such as a server, a group of servers, a desktop computer, a laptop, a portable and/or handheld device (e.g., a computer, a PDA, a smartphone, a tablet, and/or the like), and/or other like devices. In some non-limiting embodiments or aspects, map system 104 may include a system (e.g., at least one computing device, such as at least one server and/or the like) of a map service provider (e.g., an entity that provides maps and/or map data associated therewith). In some non-limiting embodiments or aspects, map system 104 may be in communication with a data storage device, which may be local or remote to map system 104. In some non-limiting embodiments or aspects, map system 104 may be capable of receiving information from, storing information in, communicating information to, or searching information stored in the data storage device. In some non-limiting embodiments or aspects, map system 104 may store map data associated with at least one map (e.g., a plurality of maps, such as a tile map, a vector map, and/or the like) of at least one geographic location (e.g., a plurality of geographic locations including roadways), as described herein. In some non-limiting embodiments or aspects, map system 104 may be part of autonomous vehicle 102.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
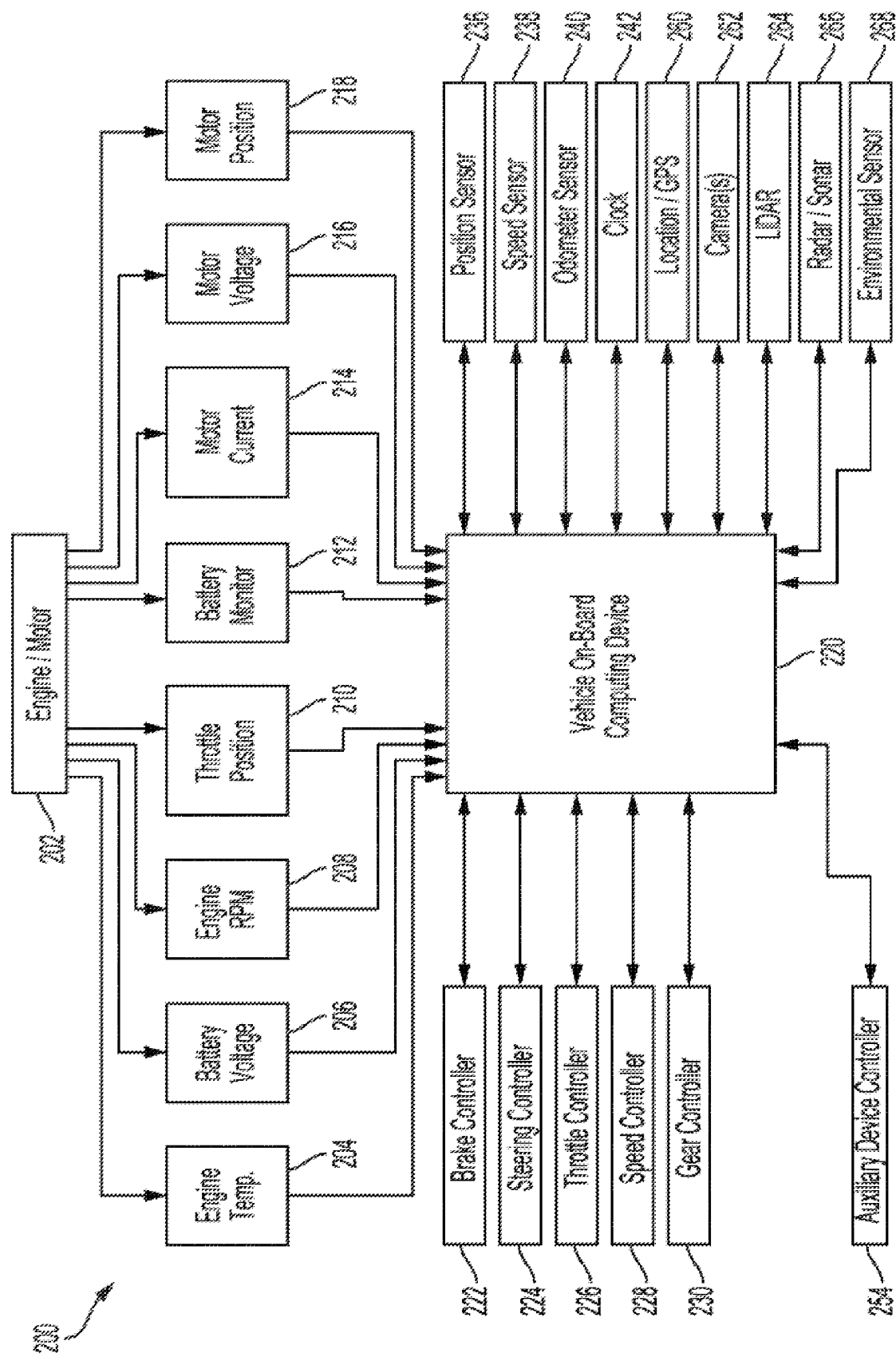
FIG. 2 is an illustration of an illustrative architecture for a vehicle according to the principles of the presently disclosed subject matter.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine rotations per minute (RPM) sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System (GPS) device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals. Captured images from cameras 262 and/or object detection information captured from sensors such as LiDAR sensor system 264 and/or radar and/or sonar system 266 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document. On-board computing device 220 may generate new map data (e.g., based on object detection data captured from sensors such as LiDAR 264, captured images from cameras 262, the map data, and/or the like). Additionally or alternatively, On-board computing device 220 may communicate sensor data (e.g., object detection data captured from sensors such as LiDAR 264, captured images from cameras 262, and/or the like) to a remote system (e.g., mapping system 106), which may generate new map data based on the sensor data.

Figure 3:
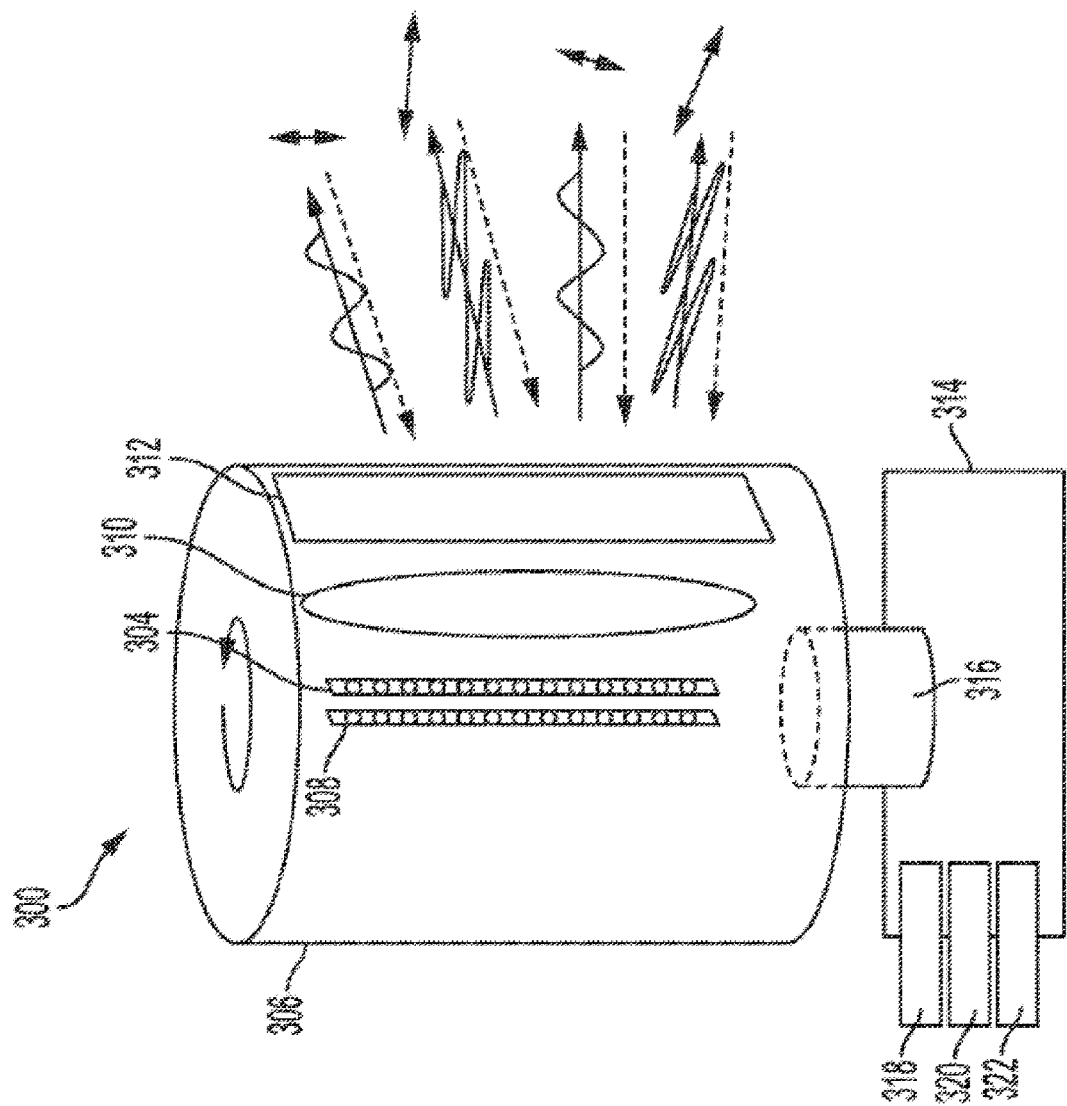
FIG. 3 is an illustration of an illustrative architecture for a LiDAR system according to the principles of the presently disclosed subject matter.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
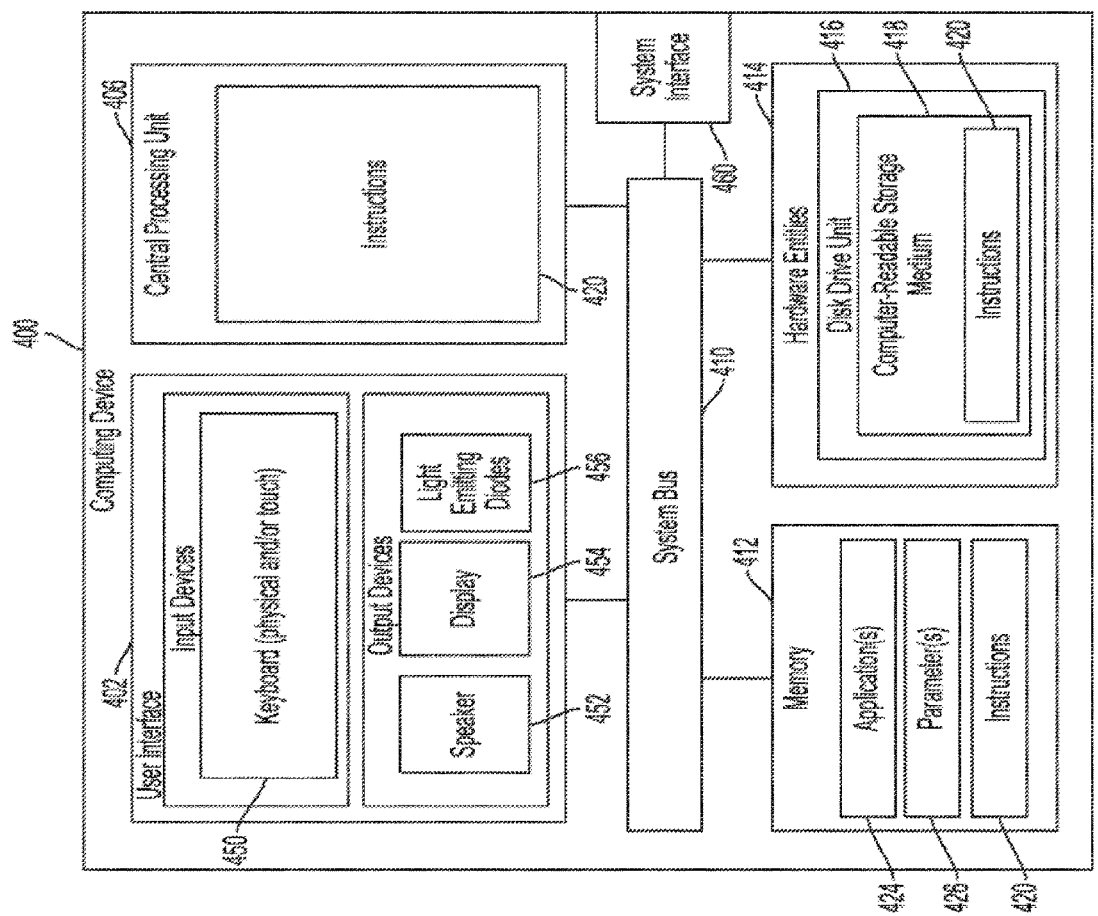
FIG. 4 is an illustration of an illustrative computing device according to the principles of the presently disclosed subject matter.

Referring now to FIG. 4, FIG. 4 is an illustration of an illustrative architecture for a computing device 400. Computing device 400 can correspond to one or more devices of (e.g., one or more devices of a system of) autonomous vehicle 102 and/or one or more devices of map system 104. In some non-limiting embodiments or aspects, one or more devices of (e.g., one or more devices of a system of) autonomous vehicle 102 and/or map system 104 may include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media," as used herein, may refer to a single medium or multiple media (e.g., a centralized or distributed database, and/or associated caches and server) that store the one or more sets of instructions 420. The term "machine readable media," as used herein, may refer to any medium that is capable of storing, encoding or carrying a set of instructions 420 for execution by computing device 400 and that cause computing device 400 to perform any one or more of the methodologies of the present disclosure.

Figure 5:
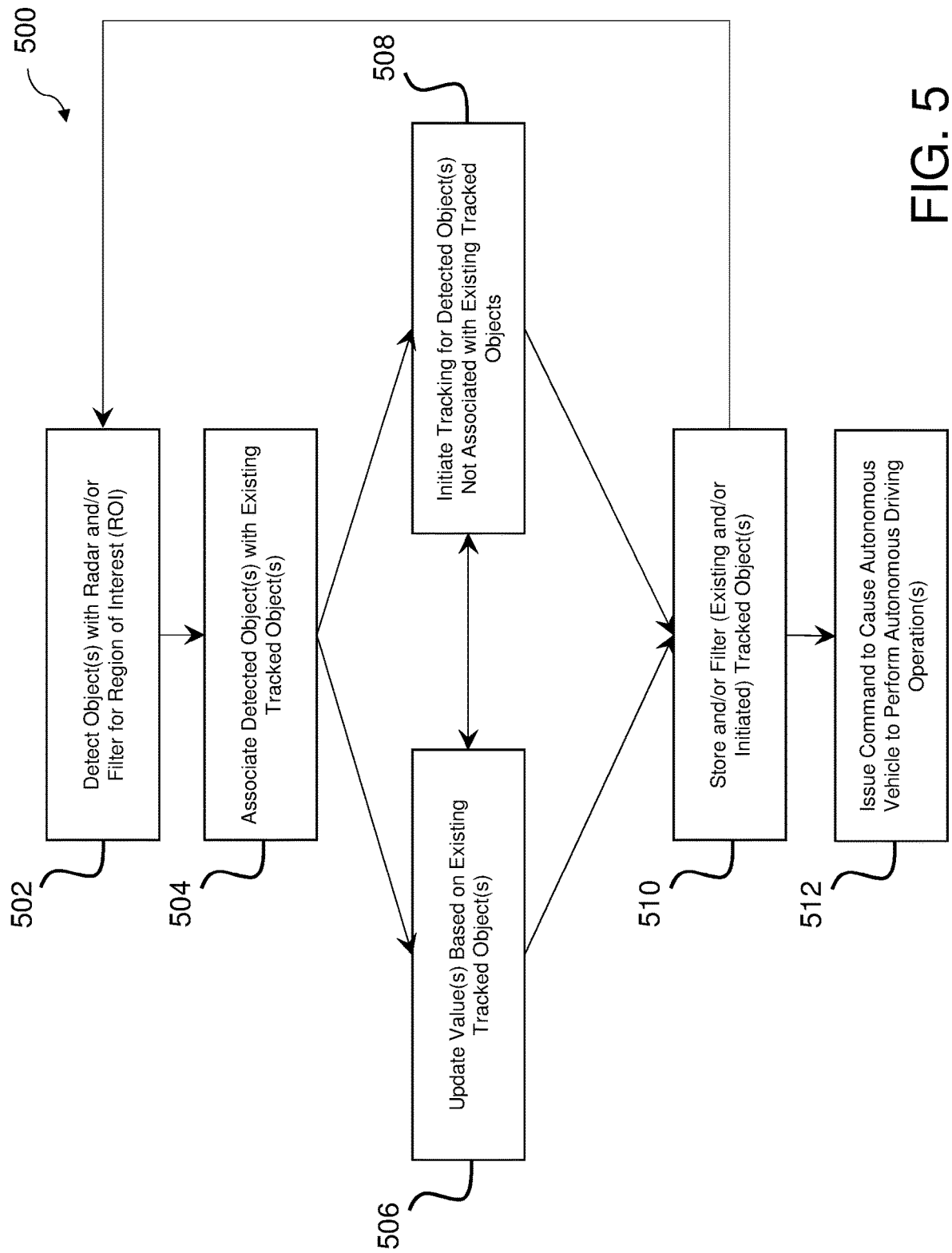
FIG. 5 is a flowchart of a non-limiting embodiment or aspect of a process for resolving level ambiguity for radar systems of autonomous vehicles according to the principles of the presently disclosed subject matter.

Referring now to FIG. 5, FIG. 5 is a flowchart of a non-limiting embodiment or aspect of a process 500 for resolving level ambiguity for radar systems of autonomous vehicles. In some non-limiting embodiments or aspects, one or more of the steps of process 500 may be performed (e.g., completely, partially, and/or the like) by autonomous vehicle 102 (e.g., one or more devices of autonomous vehicle 102). In some non-limiting embodiments or aspects, one or more of the steps of process 500 may be performed (e.g., completely, partially, and/or the like) by another system, another device, another group of systems, or another group of devices, separate from or including autonomous vehicle 102, such as map system 104 and/or the like.

As shown in FIG. 5, at step 502, process 500 may include detecting at least one object with radar and/or filtering the detected object(s) based on a region of interest (ROI). For example, autonomous vehicle 102 may detect a plurality of detected objects with a radar system (e.g., radar system 266).

In some non-limiting embodiments or aspects, the radar system 266 may include a two-dimensional (2D) radar system. For example, the radar system 266 may have relatively good resolution in one plane (e.g., a horizontal plane) but relatively poor resolution in another plane orthogonal thereto (e.g., a vertical plane). As such, the position (e.g., x and y coordinates in the horizontal plane) of each detected object may be relatively precise and accurate. However, the height (e.g., z coordinate) of each detected object may be relatively imprecise and/or inaccurate or may be unobtainable.

Figure 6A:
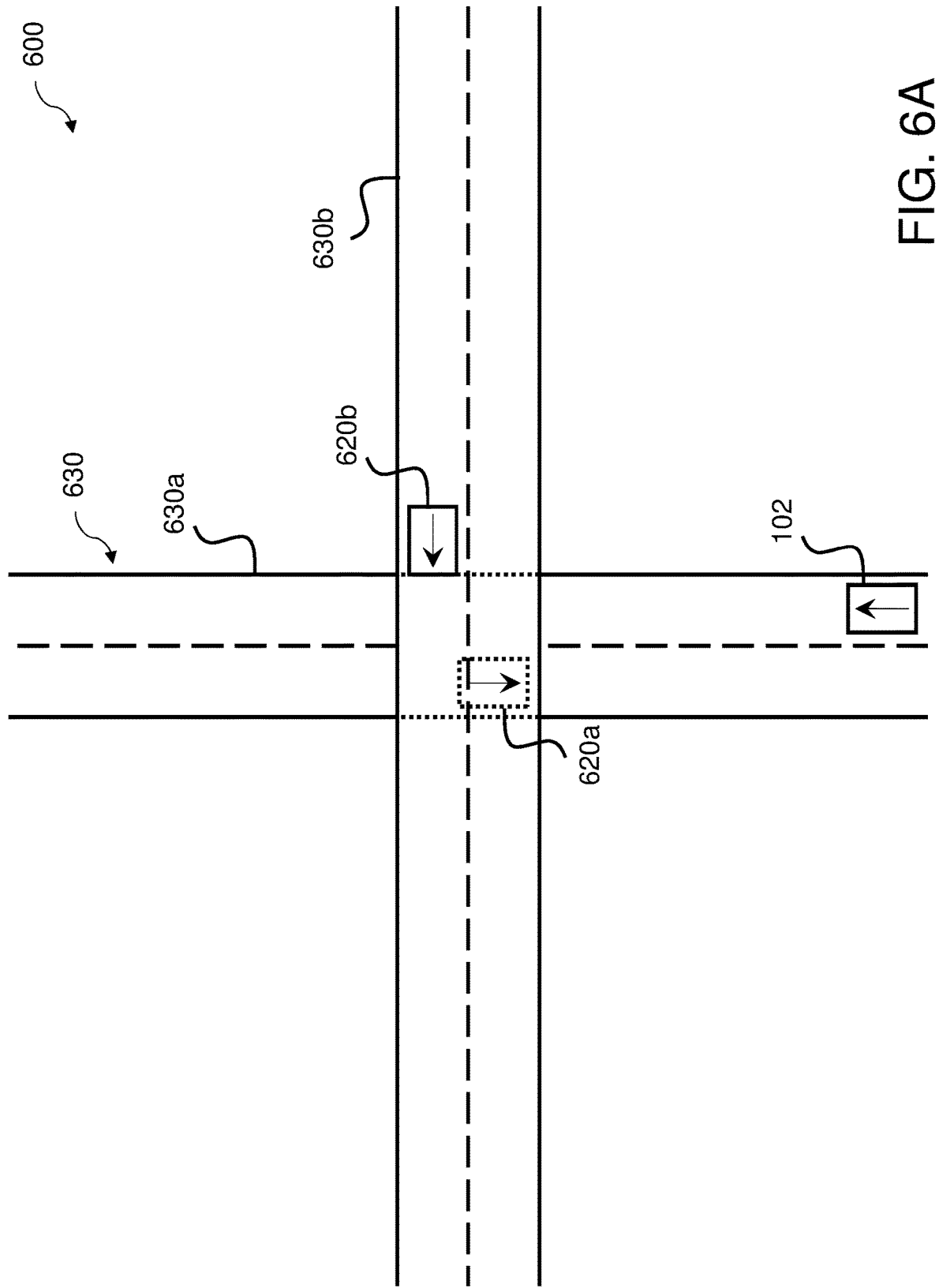

Referring now to FIGS. 6A and 6B, and with continued reference to FIG. 5, FIGS. 6A and 6B are diagrams of an exemplary scenario 600 in which a non-limiting embodiment or aspect relating to process 500 shown in FIG. 5 may be implemented. FIG. 6A is a diagram of a top view of the scenario 600, and FIG. 6B is a diagram of a perspective view of the scenario 600 from the perspective of autonomous vehicle 102. As shown in FIGS. 6A and 6B, scenario 600 may include autonomous vehicle 102, first detected object 620a, second detected object 620b, roadway 630, first level 630a, and/or second level 630b. In some non-limiting embodiments or aspects, autonomous vehicle 102, first detected object 620a, and second detected object 620b each may be traveling in the direction (e.g., have a direction of motion) indicated by the arrows thereon in FIG. 6A.

For the purpose of illustration, as shown in FIGS. 6A and 6B, autonomous vehicle 102 may detect first detected object 620a and second detected object 620b with a radar system 266. For example, autonomous vehicle 102 may be located on first level 630a of roadway 630. The radar system may provide relative accurate horizontal position (e.g., x and y coordinates in the horizontal plane) of first detected object 620a and second detected object 620b to autonomous vehicle 102. However, the radar system 266 may not provide an accurate indication of the height (e.g., level of roadway 630) for each of first detected object 620a and second detected object 620b.

With continued reference to FIG. 5, in some non-limiting embodiments or aspects, autonomous vehicle 102 may filter the detected object(s) based on the ROI. For example, the ROI may be the drivable area of the roadway 630, and/or the distance (e.g., distance in the horizontal/x-y plane) between a detected object and an ROI layer (e.g., each level of roadway 630) may determine whether the detected object is within the drivable area. If roadway 630 were simply one level (e.g., one ROI layer), the distance (e.g., horizontal distance) between each detected object and the ROI layer may be calculated and compared to a predefined threshold to decide whether the detection is within the drivable area. However, if the detected object is in a multi-level roadway 630, there would be multiple levels (e.g., multiple ROI layers), and distance between each detected object and each ROI layer may be calculated. If the minimum value of all the computed distances for each ROI layer for the respective detected object is smaller than the predefined threshold, the detected object may be considered to be within the drivable area. In some non-limiting embodiments or aspects, this may be determined based on the following equation:

$$\min(d_1, d_2, \ldots, d_N) \leq \text{threshold}$$

where di represents the distance to the ith ROI layer and N represents the total number of ROI layers. In some non-limiting embodiments or aspects, if the minimum value of all the computed distances for each ROI layer for the respective detected object does not satisfy the threshold (e.g., is not less than or equal to the threshold), then the detected object should be filtered out (e.g., removed), since it is not within the ROI.

In some non-limiting embodiments or aspects, the predetermined threshold may be 0. For example, radar may be relatively noisy compared to other sensors, so the threshold may be set to 0 so that detected objects from the radar system that are outside of the ROI (e.g., outside of the drivable area) are not included with the detected objects from the radar system.

As shown in FIG. 5, at step 504, process 500 may include associating at least one detected object with at least one existing tracked object. For example, autonomous vehicle 102 may associate each first detected object of at least one first detected object of the plurality of detected objects with a respective existing tracked object of at least one existing tracked object based on a position (e.g., first position) of each first detected object.

For the purpose of illustration, with reference to FIGS. 6A and 6B and continued reference to FIG. 5, assume that autonomous vehicle 102 had stored thereon existing tracked object data associated with an existing tracked object having an existing position in the same driving lane as first detected object 620a and relatively near the position of first detected object 620a and with an existing velocity (e.g., speed and/or direction of motion) that is the same as or similar to the velocity of first detected object 620a. As such, autonomous vehicle 102 may associate first detected object 620a with the existing tracked object. (For the purpose of illustration, assume there is not another existing tracked object corresponding to second detected object 620b.)

With continued reference to FIG. 5, in some non-limiting embodiments or aspects, associating each first detected object with the respective existing tracked object may include associating (e.g., by autonomous vehicle 102) each first detected object with the respective existing tracked object based on a nearest neighbor search. For example, associating each first detected object with the respective existing tracked object may include determining (e.g., by autonomous vehicle 102) a cost score for each first detected object and the respective existing tracked object based on the first position (e.g., position in the horizontal/x-y plane) of the first detected object, an existing position of the existing tracked object, a first velocity of the first detected object, an existing velocity of the existing tracked object, any combination thereof, and/or the like. For example, the cost score may be based on a difference between the first position and the existing position and/or a difference between the first velocity and an existing velocity. For the purpose of illustration, the cost score may be determined based on a cost function having two parts: (i) the distance (e.g., Mahalanobis distance) between the position of the (first) detected object (e.g., x_d, y_d) and position of the respective existing tracked object (e.g., x_t, y_t) and (ii) the distance (e.g., Mahalanobis distance) between the velocity (e.g., range rate) of the (first) detected object (e.g., v_d) and the velocity (e.g., range rate) of the respective existing tracked object (e.g., v_t). Additionally or alternatively, autonomous vehicle 102 may determine the cost score satisfies a threshold (e.g., the cost is less than a predetermined threshold). For example, if the cost score computed from the aforementioned cost function is less than a predefined threshold, the (first) detected object may be associated with the respective existing tracked object. In response to determining the cost score satisfies the threshold, autonomous vehicle 102 may associate the first detected object and the respective existing tracked object.

As shown in FIG. 5, at step 506, process 500 may include updating at least one value (e.g., coordinate value) based on the at least one existing tracked object. For example, autonomous vehicle 102 may determine a first height of each first detected object based on the first position of the first detected object, the respective existing tracked object, and a tile map.

In some non-limiting embodiments or aspects, a tile map may include an existing map with a plurality of tiles, in which each tile corresponds to a respective horizontal position (e.g., x and y coordinates, in predetermined increments, such as a selected number of meters (e.g., 30 m)), and each tile may have one or more heights (e.g., z coordinates) associated therewith. For example, at any given tile (e.g., given horizontal position, denoted by x and y coordinates), at least one height (e.g., z coordinate) and at least one level identifier may be included. If a given tile (e.g., horizontal position) corresponds to a multi-level roadway, that tile (e.g., horizontal position, denoted by x and y coordinates) may have a first height (z1) and a corresponding first level identifier, a second height (z2) and a corresponding second level identifier, and so on up to an Nth height (zN) and a corresponding Nth level identifier (where N is the number of levels).

In some non-limiting embodiments or aspects, determining the first height of each first detected object may include querying (e.g., by autonomous vehicle 102) the tile map based on the first position of the first detected object to provide a plurality of ground heights. Additionally or alternatively, autonomous vehicle 102 may determine a first ground height of the plurality of ground heights closest to an existing height of the respective existing tracked object. In response to that determination, autonomous vehicle 102 may select the first ground height as the first height of the first detected object.

For the purpose of illustration, with reference to FIGS. 6A and 6B and continued reference to FIG. 5, autonomous vehicle 102 may query the tile map based on the position of first detected object 620a (which is associated with an existing tracked object, as described above) to provide a plurality of ground heights (e.g., ground heights for first level 630a and second level 630b). Additionally or alternatively, autonomous vehicle 102 may determine a first ground height (e.g., the height of first level 630a) is closest to the existing height of the respective existing tracked object. In response to that determination, autonomous vehicle 102 may select the first ground height (e.g., the height of first level 630a) as the height of first detected object 620a.

As shown in FIG. 5, at step 508, process 500 may include initiating tracking for at least one detected object not associated with the existing tracked object(s). For example, autonomous vehicle 102 may determine a second height of each second detected object of at least one second detected object of the plurality of detected objects not associated with the at least one existing tracked object based on a second position of each second detected object, a vector map, and the tile map.

In some non-limiting embodiments or aspects, a vector map may include an existing map with a plurality of lane segments, in which each lane segment corresponds to a respective horizontal position (e.g., x and y coordinates), and each lane segment has a lane orientation (e.g., a direction of travel for the lane) associated therewith. For example, at any given horizontal position (denoted by x and y coordinates), at least one lane segment with a corresponding lane orientation may be included. In some non-limiting embodiments or aspects, each lane segment of the vector map may correspond to one or more tiles of a corresponding tile map. In some non-limiting embodiments or aspects, a level identifier may be included with each lane segment (e.g., at least for areas of the vector map where a roadway is multi-level). In some non-limiting embodiments or aspects, tile indices (e.g., horizontal position on the tile map (coordinates xt and yt) and at least one level identifiers (first level identifier, second level identifier, etc.)) may be included with each lane segment.

In some non-limiting embodiments or aspects, determining the second height of each second detected object may include querying (e.g., by autonomous vehicle 102) the tile map based on the second position of the second detected object to provide a plurality of ground heights and a first set of tile indices. For example, the first set of tile indices may include a horizontal position on the tile map (e.g., coordinates xt and yt) and a plurality of level identifiers (first level identifier, second level identifier, etc.). Additionally or alternatively, autonomous vehicle 102 may determine a plurality of lane segments from the vector map corresponding the second position of the second detected object (e.g., at least one first lane segment associated with a first level identifier, at least one second lane segment associated with a second level identifier, etc.). Additionally or alternatively, autonomous vehicle 102 may determine a cost score for each respective lane segment of the plurality of lane segments based on the second position of the second detected object (e.g., the center of the second detected object), a respective center of the respective lane segment, a direction of motion of the second detected object, a lane orientation of the respective lane segment, any combination thereof, and/or the like. For example, the cost score may be based on a difference between the second position and the respective center and/or a difference between the direction of motion and the lane orientation. Additionally or alternatively, autonomous vehicle 102 may select a first lane segment of the plurality of lane segments based on the cost score of the first lane segment. For example, autonomous vehicle 102 may select the one of the plurality of lane segments with a lowest cost score as the first lane segment. Additionally or alternatively, autonomous vehicle 102 may compare a second set of tile indices (e.g., horizontal position (coordinates xt and yt) and a level identifier) associated with the first (e.g., selected) lane segment with the first set of tile indices to determine whether the second set of tile indices matches the first set of tile indices. In some non-limiting embodiments or aspects, in response to determining that the second set of tile indices matches the first set of tile indices, autonomous vehicle 102 may select a first ground height of the plurality of ground heights associated with the second set of tile indices (e.g., the level identifier thereof) as the second height of the second detected object. Alternatively, in response to determining that the second set of tile indices does not match the first set of tile indices, autonomous vehicle 102 may select a default or pseudo height as the second height of the second detected object. For example, autonomous vehicle 102 may select a height of autonomous vehicle 102 as the second height of the second detected object (e.g., when the height of the second detected object cannot be determined because the tile indices do not match, assume the second detected object is on the same level as autonomous vehicle 102 so that autonomous vehicle 102 can control autonomous driving operations to avoid the second detected object).

For the purpose of illustration, with reference to FIGS. 6A and 6B and continued reference to FIG. 5, autonomous vehicle 102 may determine the height of second detected object 620b (which, as described above, is assumed to not be associated with an existing tracked object) based on the position of second detected object 620b, a vector map, and a tile map, as described above.

As shown in FIG. 5, at step 510, process 500 may include storing and/or filtering at least one tracked object (e.g., existing tracked object and/or newly initiated tracked object). For example, autonomous vehicle 102 may store first tracked object data based on the first height determined for each first detected object associated with each respective existing tracked object. Additionally or alternatively, autonomous vehicle 102 may store, with the at least one processor, second tracked object data based on the second height determined for each second detected object.

In some non-limiting embodiments or aspects, the first tracked object data may include the at least one first detected object and the first height determined for each first detected object. Additionally or alternatively, the second tracked object data may include the at least one second detected object and the second height determined for each second detected object.

In some non-limiting embodiments or aspects, the first tracked object data may include update data for the at least one existing tracked object based on the first height and the at least one first detected object (e.g., the first position thereof). Additionally or alternatively, storing the first tracked object data may include communicating the update data to a tracked object storage system (e.g., which stores existing tracked object data associated with the at least one existing tracked object). In some non-limiting embodiments or aspects, the second tracked object data may include initiation data for initiating tracking of the at least one second detected object based on the second height and the at least one second detected object. Additionally or alternatively, storing the second tracked object data may include communicating the initiation data to the tracked object storage system. In some non-limiting embodiments or aspects, existing tracked object data associated with the at least one existing tracked object is at least one of updated, added to, or replaced (e.g., completely, partially, and/or the like) based on the first tracked object data, the second tracked object data, any combination thereof, and/or the like.

In some non-limiting embodiments or aspects, tracked object storage system may predict the motion of one or more tracked objects, e.g., from the current time to a future time. Additionally or alternatively, tracked object storage system may use the data (e.g., first and/or second tracked object data) to update existing tracked objects and/or initiate tracking of newly detected objects (e.g., which will then be existing tracked objects for future time periods).

As shown in FIG. 5, at step 512, process 500 may include issuing a command to cause the autonomous vehicle to perform at least one autonomous driving operation. For example, autonomous vehicle 102 (e.g., a vehicle on-board computing device thereof) may issue a command to cause the autonomous vehicle to perform at least one autonomous driving operation based on the first tracked object data and the second tracked object data.

In some non-limiting embodiments or aspects, the at least one autonomous driving operation may include controlling (e.g., by autonomous vehicle 102) at least one of braking, steering, acceleration, any combination thereof, and/or the like of autonomous vehicle 102 to avoid at least one of the at least one first detected object and/or the at least one second detected object, e.g., based on at least one of the first height determined for the at least one first detected object or the second height determined for the at least one second detected object, respectively.

For the purpose of illustration, with reference to FIGS. 6A and 6B and continued reference to FIG. 5, autonomous vehicle 102 may control autonomous driving operations (e.g., steering, braking, accelerating, and/or the like) to avoid first detected object 620a based on determining that the height of first detected object 620a is the same as the height of autonomous vehicle 102 (e.g., both first detected object 620a and autonomous vehicle 102 are on first level 630a). Additionally or alternatively, autonomous vehicle 102 may ignore second detected object 620a when controlling autonomous driving operations based on determining that the height of second detected object 620b is not the same as the height of autonomous vehicle 102 (e.g., second detected object 620b is on second level 630b and autonomous vehicle 102 is on first level 630a).

In some non-limiting embodiments, autonomous vehicle 102 may iteratively repeat steps 502-512. For example, autonomous vehicle 102 may detect at least one further object with radar, as described herein (e.g., step 502). Additionally or alternatively, autonomous vehicle 102 may associate at least one detected further object with at least one existing tracked object, as described herein (e.g., step 504). Additionally or alternatively, autonomous vehicle 102 may updating at least one value (e.g., coordinate value) for at least one existing tracked object, as described herein (e.g., step 506). Additionally or alternatively, autonomous vehicle 102 may initiating tracking for at least one detected further object not associated with the existing tracked object(s), as described herein (e.g., step 508). Additionally or alternatively, autonomous vehicle 102 may store and/or filter at least one tracked object (e.g., existing tracked object and/or newly initiated tracked object), as described herein (e.g., step 510). Additionally or alternatively, autonomous vehicle 102 may issue a further command to cause the autonomous vehicle 102 to perform at least one further autonomous driving operation based on the tracked object(s), as described herein (e.g., step 512).

In some non-limiting embodiments or aspects, autonomous vehicle 102 may replace the existing tracked objects with the first detected object(s) and/or the second detected object(s), which will become the existing tracked objects for future iterations of process 500 (e.g., in a next time step, the first/second tracked object from the previous time step are deemed to be the existing tracked objects).

Figure 7A:
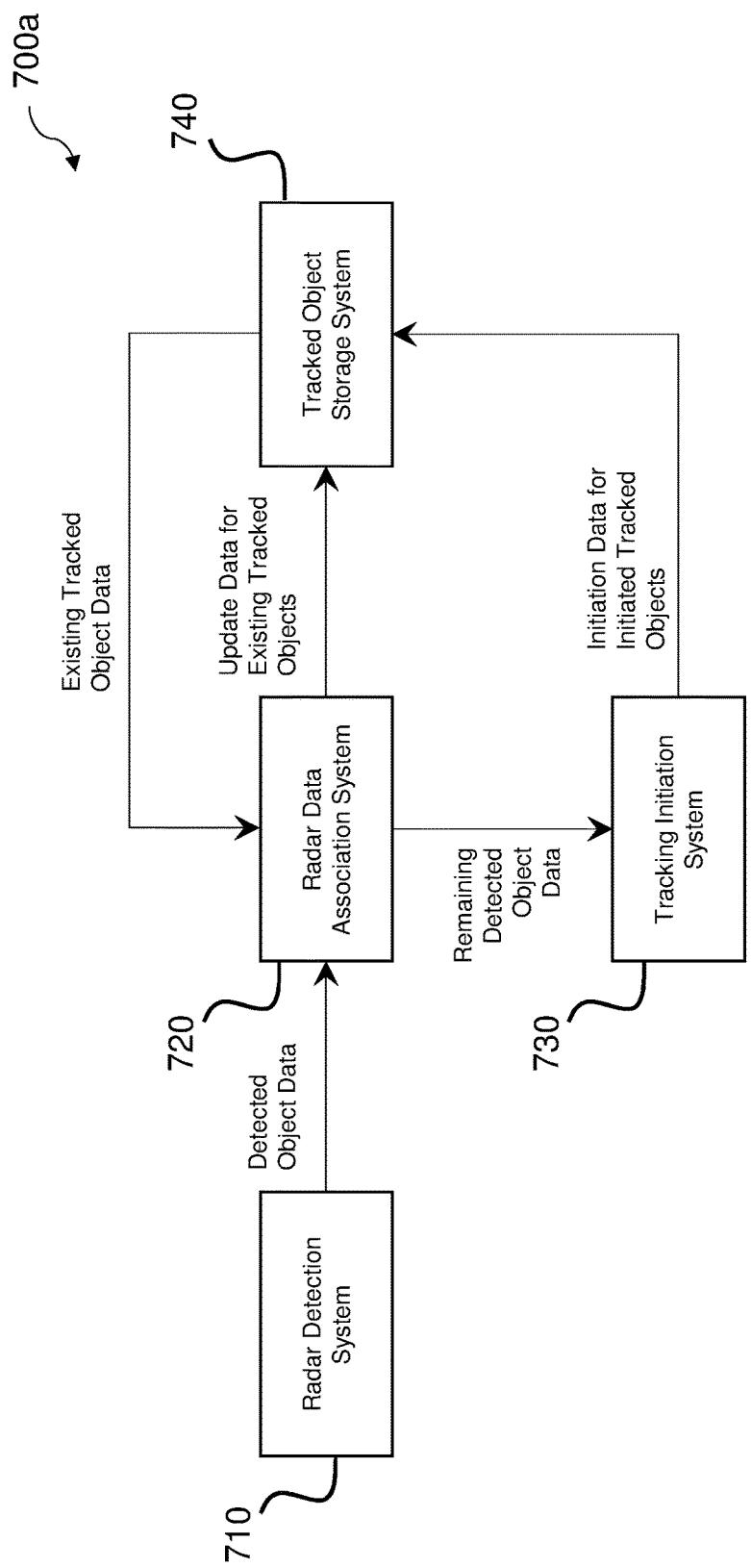
FIGS. 7A-7C are flowcharts of an exemplary implementation of a non-limiting embodiment or aspect of the process shown in FIG. 5 according to the principles of the presently disclosed subject matter.

Referring now to FIG. 7A, FIG. 7A is a diagram of an exemplary implementation 700a of a non-limiting embodiment or aspect relating to process 500 shown in FIG. 5. In some non-limiting embodiments or aspects, implementation 700a may be implemented (e.g., completely, partially, and/or the like) by autonomous vehicle 102 (e.g., one or more devices of autonomous vehicle 102). In some non-limiting embodiments or aspects, implementation 700a may be implemented (e.g., completely, partially, and/or the like) by another system, another device, another group of systems, or another group of devices, separate from or including autonomous vehicle 102, such as map system 104. As shown in FIG. 7A, implementation 700a may include radar detection system 710, radar data association system 720, tracking initiation system 730, and/or tracked object storage system 740. In some non-limiting embodiments, each of radar detection system 710, radar data association system 720, tracking initiation system 730, and/or tracked object storage system 740 may be the same as, similar to, and/or part of (e.g., a subsystem of) autonomous vehicle 102.

In some non-limiting embodiments or aspects, radar detection system 710 may be configured to detect a plurality of detected objects with a radar system of an autonomous vehicle 102, as described herein. Additionally or alternatively, radar detection system 710 may be configured to communicate detected object data associated with the plurality of detected objects (e.g., to radar data association system 720), as described herein. In some non-limiting embodiments or aspects, radar detection system 710 may be configured to filter the detected object(s) based on the ROI, as described herein.

In some non-limiting embodiments or aspects, radar data association system 720 may be configured to receive the detected object data (e.g., from radar detection system 710). Additionally or alternatively, radar data association system 720 may be configured to receive existing tracked object data associated with at least one existing tracked object (e.g., from tracked object storage system 740), as described herein.

In some non-limiting embodiments or aspects, radar data association system 720 may be configured to associate each first detected object of at least one first detected object of the plurality of detected objects with a respective existing tracked object of the at least one existing tracked object based on a first position of each first detected object, as described herein. Additionally or alternatively, radar data association system 720 may be configured to determine a first height of each first detected object based on the first position of the first detected object, the respective existing tracked object, and a tile map, as described herein. In some non-limiting embodiments or aspects, radar data association system 720 may be configured to first tracked object data based on the first height determined for each first detected object associated with each respective existing tracked object (e.g., to tracked object storage system 740), as described herein. For example, the first tracked object data may include update data for the at least one existing tracked object based on the first height and the at least one first detected object (e.g., the first position thereof), as described herein. Additionally or alternatively, the first tracked object data may include the at least one first detected object and the first height determined for each first detected object.

In some non-limiting embodiments or aspects, radar data association system 720 may be configured to communicate at least a portion of the detected object data associated with at least one second detected object of the plurality of detected objects not associated with the at least one existing tracked object (e.g., to tracking initiation system 730), as described herein.

In some non-limiting embodiments or aspects, tracking initiation system 730 may be configured to receive the at least the portion of the detected object data associated with the at least one second detected object not associated with the at least one existing tracked object, as described herein. Additionally or alternatively, tracking initiation system 730 may be configured to determine a second height of each second detected object based on a second position of each second detected object, a vector map, and the tile map, as described herein.

In some non-limiting embodiments or aspects, tracking initiation system 730 may be configured to communicate second tracked object data based on the second height determined for each second detected object (e.g., to tracked object storage system 740), as described herein. In some non-limiting embodiments or aspects, the second tracked object data may include initiation data for initiating tracking of the at least one second detected object based on the second height and the at least one second detected object, as described herein. Additionally or alternatively, the second tracked object data may include the at least one second detected object and the second height determined for each second detected object, as described herein.

In some non-limiting embodiments or aspects, tracked object storage system 740 may be configured to receive and/or store the first tracked object data and the second tracked object data to facilitate at least one autonomous driving operation of the autonomous vehicle 102 based on the first tracked object data and the second tracked object data, as described herein. For example, a vehicle on-board computing device 220 may issue a command to cause the autonomous vehicle 102 to perform at least one autonomous driving operation based on the (first and/or second) tracked object data stored by the tracked object storage system 740, as described herein. In some non-limiting embodiments or aspects, tracked object storage system 740 may be configured to at least one of update, add to, or replace (e.g., completely, partially, and/or the like) existing tracked object data associated with the at least one existing tracked object based on the first tracked object data, the second tracked object data, any combination thereof, and/or the like, as described herein.

Figure 7B:
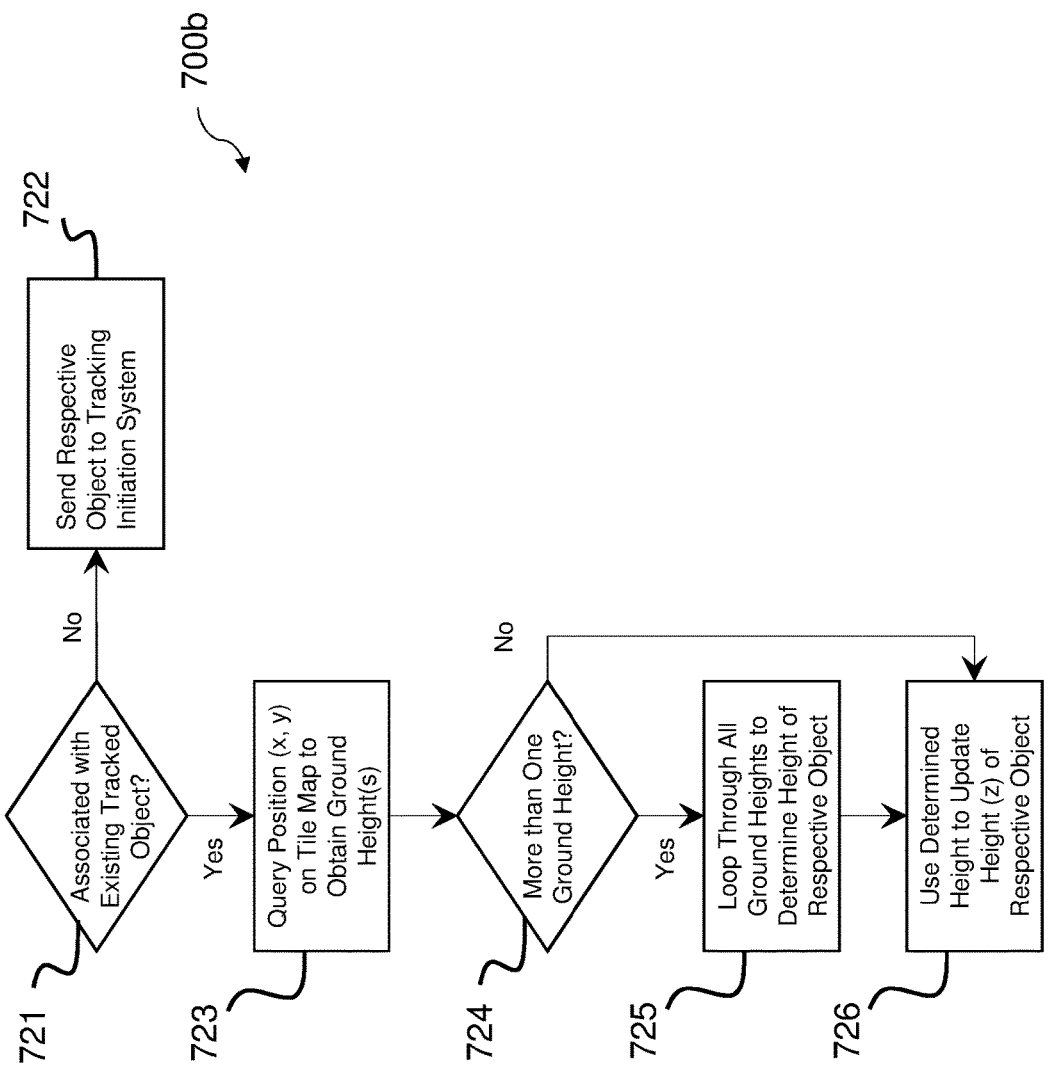

Referring now to FIG. 7B, and with continued reference to FIG. 7A, FIG. 7B is a flowchart of an exemplary implementation 700b of a non-limiting embodiment or aspect relating to process 500 shown in FIG. 5. In some non-limiting embodiments or aspects, one or more of the steps of implementation 700b may be performed (e.g., completely, partially, and/or the like) by radar data association system 720. In some non-limiting embodiments or aspects, one or more of the steps of implementation 700b may be performed (e.g., completely, partially, and/or the like) by another system, another device, another group of systems, or another group of devices, separate from or including radar data association system 720, such as autonomous vehicle 102 and/or map system 104.

As shown in FIG. 7B, at step 721, implementation 700b may include determining whether a detected object can be associated with an existing tracked object, as described herein. For example, radar data association system 720 may determine at least one first detected object may be associated with a respective existing tracked object based on a first position of each first detected object, as described herein. Additionally or alternatively, radar data association system 720 may determine at least one second detected object may not be associated with the existing tracked object(s) (e.g., based on a second position of each second detected object), as described herein. In some non-limiting embodiments or aspects, for each first detected object that may be associated with a respective existing tracked object, radar data association system 720 may proceed to step 723. Additionally or alternatively, as shown in FIG. 7B at step 722, for each second detected object that may not be associated with the existing tracked object(s), radar data association system 720 may communicate the second detected object(s) to tracking initiation system 730.

As shown in FIG. 7B, at step 723, implementation 700b may include querying the tile map based on the positions of the detected objects(s) to obtain at least one ground height. For example, radar data association system 720 may query the tile map based on the first position of the first detected object to provide a plurality of ground heights, as described herein.

As shown in FIG. 7B, at step 724, implementation 700b may include determining whether there is more than one ground height. For example, in response to querying the tile map, radar data association system 720 may determine that there is only one ground height. If so, that one ground height may be selected as the height of the respective (first) detected object (step 726). Additionally or alternatively, in response to querying the tile map, radar data association system 720 may determine that there are multiple ground heights. If so, radar data association system 720 may proceed to step 725.

As shown in FIG. 7B, at step 725, implementation 700b may include looping through all of the ground heights to determine the height of the respective (first) detected object. For example, radar data association system 720 may determine a first ground height of the plurality of ground heights is closest to an existing height of the respective existing tracked object associated with the respective (first) detected object, as described herein.

As shown in FIG. 7B, at step 725, implementation 700b may include using the determined height as the height of the respective (first) detected object. For example, in response to determining the first ground height is closest to the existing height, radar data association system 720 may select the first ground height as the first height of the first detected object, as described herein. (Additionally or alternatively, if there is only one level, the height of that level may be used as the height of the respective detected object, as described above.)

Figure 7C:
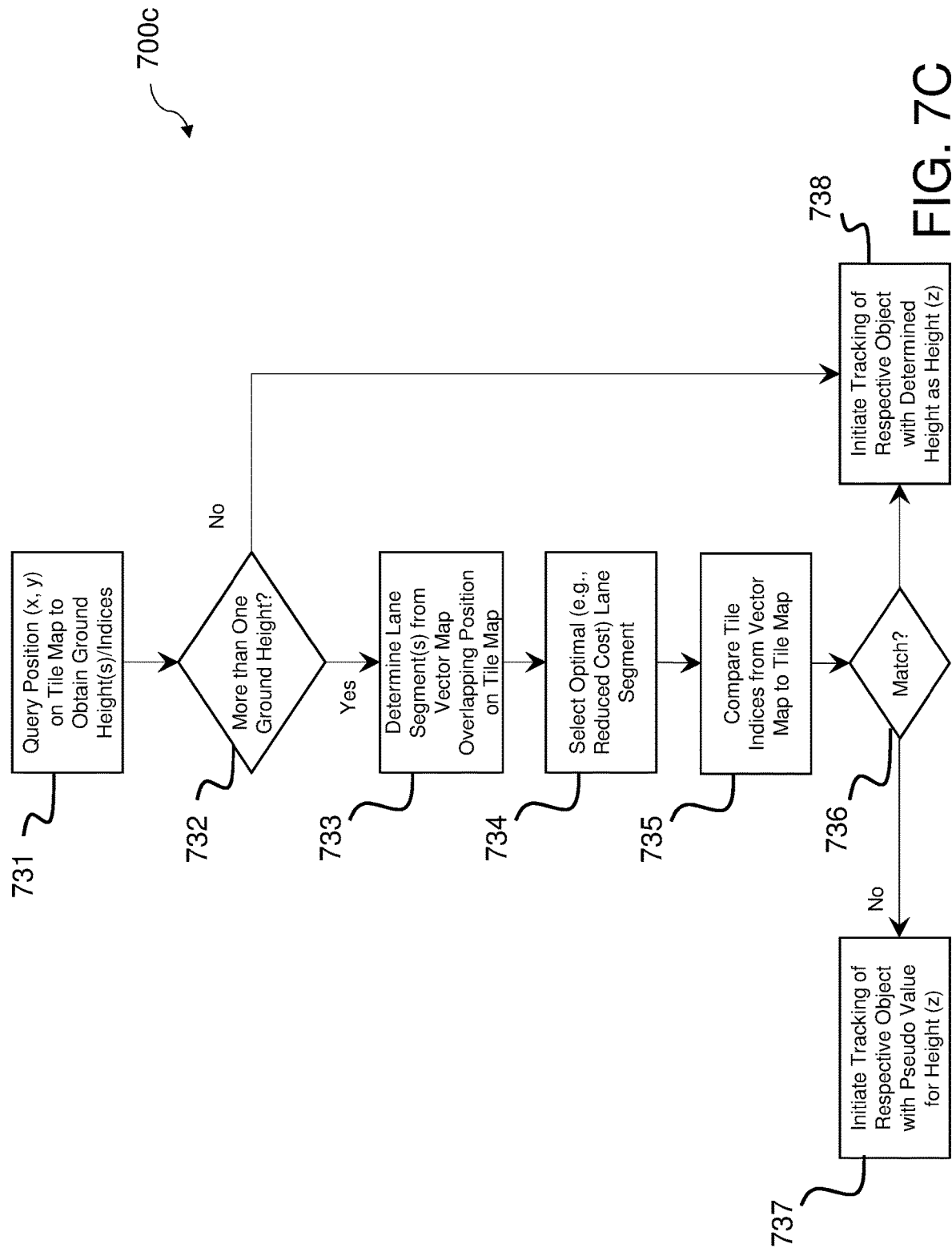

Referring now to FIG. 7C, and with continued reference to FIG. 7A, FIG. 7C is a flowchart of an exemplary implementation 700c of a non-limiting embodiment or aspect relating to process 500 shown in FIG. 5. In some non-limiting embodiments or aspects, one or more of the steps of implementation 700c may be performed (e.g., completely, partially, and/or the like) by tracking initiation system 730. In some non-limiting embodiments or aspects, one or more of the steps of implementation 700b may be performed (e.g., completely, partially, and/or the like) by another system, another device, another group of systems, or another group of devices, separate from or including tracking initiation system 730, such as autonomous vehicle 102 and/or map system 104.

As shown in FIG. 7C, at step 731, implementation 700c may include querying the tile map based on the positions of the detected objects(s) to obtain at least one ground height and tile indices. For example, tracking initiation system 730 may query the tile map based on the (second) position of the respective (second) detected object to provide at least one ground height and a first set of tile indices, as described herein.

As shown in FIG. 7C, at step 732, implementation 700b may include determining whether there is more than one ground height. For example, in response to querying the tile map, tracking initiation system 730 may determine that there is only one ground height. If so, that one ground height may be selected as the height of the respective (second) detected object (step 738). Additionally or alternatively, in response to querying the tile map, tracking initiation system 730 may determine that there are multiple ground heights. If so, tracking initiation system 730 may proceed to step 733.

As shown in FIG. 7C, at step 733, implementation 700b may include determining lane segment(s) from the vector map overlapping the position on tile map. For example, tracking initiation system 730 may determine a plurality of lane segments from the vector map corresponding the (second) position of the respective (second) detected object, as described herein.

As shown in FIG. 7C, at step 734, implementation 700b may include selecting the optimal lane segment (e.g., the lane segment with the lowest cost). For example, tracking initiation system 730 may determine a cost score for each respective lane segment of the plurality of lane segments based on the (second) position of the respective (second) detected object, a respective center of the respective lane segment, a direction of motion of the second detected object, and a lane orientation of the respective lane segment, as described herein. Additionally or alternatively, tracking initiation system 730 may select a first lane segment of the plurality of lane segments based on the cost score of the first lane segment (e.g., the lane segment with the lowest cost score), as described herein.

As shown in FIG. 7C, at step 735, implementation 700b may include comparing tile indices from vector map to the tile indices from the tile map. For example, tracking initiation system 730 may compare a second set of tile indices associated with the first lane segment with the first set of tile indices from querying the tile map to determine whether the second set of tile indices matches the first set of tile indices, as described herein.

As shown in FIG. 7C, at step 736, implementation 700b may include determining whether the tile indices match. For example, based on the comparison of the second set of tile indices associated with the first lane segment with the first set of tile indices from querying the tile map, tracking initiation system 730 may determine whether the second set of tile indices matches the first set of tile indices.

As shown in FIG. 7C, at step 737, implementation 700b may include initiating tracking of the respective detected object with a pseudo value for height. For example, in response to determining that the second set of tile indices does not match the first set of tile indices, tracking initiation system 730 may select a height of the autonomous vehicle 102 as the second height of the second detected object (e.g., as a default or pseudo height), as described herein.

As shown in FIG. 7C, at step 738, implementation 700b may include initiating tracking of the respective detected object with a determined value for height. For example, in response to determining that the second set of tile indices matches the first set of tile indices, tracking initiation system 730 may select a first ground height of the plurality of ground heights associated with the second set of tile indices as the (second) height of the respective (second) detected object, as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A method for resolving level ambiguity for radar systems of autonomous vehicles, comprising:
   detecting, with at least one processor, a plurality of detected objects with a radar system of an autonomous vehicle;
   associating, with the at least one processor, each first detected object of at least one first detected object of the plurality of detected objects with a respective existing tracked object of at least one existing tracked object based on a first position of each first detected object;
   storing, with the at least one processor, first tracked object data based on a first height determined for each first detected object associated with each respective existing tracked object, the first height of each first detected object being determined by:
      querying, with the at least one processor, a tile map based on the first position of the first detected object to provide a plurality of ground heights; and
      determining, with the at least one processor, a first ground height of the plurality of ground heights closest to an existing height of the respective existing tracked object as the first height of the first detected object; and
   issuing, with the at least one processor, a command to cause the autonomous vehicle to perform at least one autonomous driving operation, the command being based on the first-height of each first detected object.

2. The method of claim 1, wherein the radar system comprises a two-dimensional (2D) radar system.

3. The method of claim 1, wherein associating each first detected object with the respective existing tracked object comprises associating, with the at least one processor, each first detected object with the respective existing tracked object based on a nearest neighbor search.

4. The method of claim 3, wherein associating each first detected object with the respective existing tracked object comprises:
   in response to determining that a cost score for each first detected object and the respective existing tracked object satisfies a threshold, associating the first detected object and the respective existing tracked object, wherein the cost score for each first detected object and the respective existing tracked object is based on the first position of the first detected object, an existing position of the existing tracked object, a first velocity of the first detected object, and an existing velocity of the existing tracked object.

5. The method of claim 1, wherein the first tracked object data comprises the at least one first detected object and the first height determined for each first detected object.

6. The method of claim 1, wherein the first tracked object data comprises update data for the at least one existing tracked object based on the first height and the at least one first detected object, and wherein storing the first tracked object data comprises communicating, with the at least one processor, the update data to a tracked object storage system.

7. The method of claim 1, wherein existing tracked object data associated with the at least one existing tracked object is at least one of updated, added to, or replaced based on the first tracked object data and the second tracked object data.

8. The method of claim 1, further comprising:
   storing, with the at least one processor, second tracked object data based on a second height determined for each second detected object, the second height of each second detected object of at least one second detected object of the plurality of detected objects not associated with the at least one existing tracked object being based on a second position of each second detected object, a vector map, and the tile map.

9. The method of claim 8, wherein the second height of each second detected object is determined by:
   querying, with the at least one processor, the tile map based on the second position of the second detected object to provide a plurality of ground heights and a first set of tile indices;
   selecting, with the at least one processor, a first lane segment of a plurality of lane segments based on a cost score for each respective lane segment of the plurality of lane segments, wherein the plurality of lane segments is based on a vector map corresponding the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment;
   comparing, with the at least one processor, a second set of tile indices associated with the first lane segment with the first set of tile indices to determine whether the second set of tile indices matches the first set of tile indices; and
   one of:
      in response to determining that the second set of tile indices matches the first set of tile indices, selecting, with the at least one processor, a first ground height of the plurality of ground heights associated with the second set of tile indices as the second height of the second detected object; or
      in response to determining that the second set of tile indices does not match the first set of tile indices, selecting, with the at least one processor, a height of the autonomous vehicle as the second height of the second detected object.

10. The method of claim 8, wherein the second tracked object data comprises the at least one second detected object and the second height determined for each second detected object.

11. The method of claim 8, wherein the second tracked object data comprises initiation data for initiating tracking of the at least one second detected object based on the second height and the at least one second detected object, and wherein storing the second tracked object data comprises communicating, with the at least one processor, the initiation data to a tracked object storage system.

12. The method of claim 8, wherein a plurality of tracked objects comprises the at least one first detected object and the at least one second detected object, the method further comprising:
   detecting, with the at least one processor, a plurality of further detected objects with the radar system of the autonomous vehicle;
   associating, with the at least one processor, each first further detected object of at least one first further detected object of the plurality of further detected objects with a respective tracked object of the plurality of tracked objects based on a first further position of each first further detected object;
   storing, with the at least one processor, first further tracked object data based on a first further height determined for each first further detected object associated with each respective tracked object, the first further height of each first further detected object being based on the first further position of the first further detected object, the respective tracked object, and the tile map;

storing, with the at least one processor, second further tracked object data based on a second further height determined for each second further detected object, the second height of each second further detected object of at least one second further detected object of the plurality of further detected objects not associated with the plurality of tracked objects being based on a second further position of each second further detected object, the vector map, and the tile map; and issuing, with the at least one processor, a further command to cause the autonomous vehicle to perform at least one further autonomous driving operation, the further command being based on the first further tracked object data and the second further tracked object data.

13. The method of claim 12, further comprising:
replacing, with the at least one processor, the plurality of tracked objects with the at least one first further detected object and the at least one second further detected object; and
repeating, with the at least one processor, detecting the plurality of further detected objects, associating each first further detected object with the respective tracked object of the plurality of tracked objects, storing the first further tracked object data, storing the second further tracked object data, and issuing the further command continuously while the autonomous vehicle is operating.

14. The method of claim 8, wherein the at least one autonomous driving operation comprises controlling, with the at least one processor, at least one of braking, steering, or acceleration of the autonomous vehicle to avoid at least one of the at least one first detected object or the at least one second detected object based on at least one of the first height determined for the at least one first detected object or the second height determined for the at least one second detected object, respectively.

15. The method of claim 1 wherein the plurality of ground heights retrieved from the tile map represent a plurality of different road levels.

16. A system for resolving level ambiguity for radar systems of autonomous vehicles, comprising:
a radar detection system configured to:
detect a plurality of detected objects with a radar system of an autonomous vehicle; and
communicate detected object data associated with the plurality of detected objects;
a radar data association system configured to:
receive the detected object data,
receive existing tracked object data associated with at least one existing tracked object;
associate each first detected object of at least one first detected object of the plurality of detected objects with a respective existing tracked object of the at least one existing tracked object based on a first position of each first detected object;
communicate first tracked object data based on a first height determined for each first detected object associated with each respective existing tracked object, the first height of each first detected object being determined by:

querying a tile map based on the first position of the first detected object to provide a plurality of ground heights associated with different road levels; and
determining a first ground height of the plurality of ground heights closest to an existing height of the respective existing tracked object as the first height of the first detected object; and
communicate at least a portion of the detected object data associated with at least one second detected object of the plurality of detected objects not associated with the at least one existing tracked object;
a tracking initiation system configured to:
receive the at least the portion of the detected object data associated with the at least one second detected object of the plurality of detected objects not associated with the at least one existing tracked object; and
communicate second tracked object data based on a second height determined for each second detected object, the second height of each second detected object of the at least one second detected object being based on a second position of each second detected object, a vector map, and the tile map;
a tracked object storage system configured to:
receive and store the first tracked object data and the second tracked object data; and
a vehicle on-board computing device configured to:
issue a command to cause the autonomous vehicle to perform at least one autonomous driving operation, the command being based on the first tracked object data and the second tracked object data.

17. The system of claim 16, wherein the second height of each second detected object is determined by:
querying the tile map based on the second position of the second detected object to provide a plurality of ground heights and a first set of tile indices;
selecting a first lane segment of a plurality of lane segments based on a cost score for each respective lane segment of the plurality of lane segments, wherein the plurality of lane segments is based on a vector map corresponding to the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment;
comparing a second set of tile indices associated with the first lane segment with the first set of tile indices to determine whether the second set of tile indices matches the first set of tile indices; and
one of:
in response to determining that the second set of tile indices matches the first set of tile indices, selecting a first ground height of the plurality of ground heights associated with the second set of tile indices as the second height of the second detected object; or
in response to determining that the second set of tile indices does not match the first set of tile indices, selecting a height of the autonomous vehicle as the second height of the second detected object.

18. A computer program product for resolving level ambiguity for radar systems of autonomous vehicles, the computer program product comprising at least one non-transitory computer-readable medium comprising one or more instructions that, when executed by at least one processor, cause the at least one processor to:
  detect a plurality of detected objects with a radar system of an autonomous vehicle;
  associate each first detected object of at least one first detected object of the plurality of detected objects with a respective existing tracked object of at least one existing tracked object based on a first position of each first detected object;
  store first tracked object data based on a first height determined for each first detected object associated with each respective existing tracked object, the first height of each first detected object being determined by:
    querying a tile map based on the first position of the first detected object to provide a plurality of ground heights associated with different road levels; and
    determining a first ground height of the plurality of ground heights closest to an existing height of the respective existing tracked object as the first height of the first detected object;
  store second tracked object data based on a second height determined for each second detected object, the second height of each second detected object of at least one second detected object of the plurality of detected objects not associated with the at least one existing tracked object being based on a second position of each second detected object, a vector map, and the tile map; and
  issue a command to cause the autonomous vehicle to perform at least one autonomous driving operation, the command being based on the first tracked object data and the second tracked object data.

19. The computer program product of claim 18, wherein the second height of each second detected object is determined by:
  querying the tile map based on the second position of the second detected object to provide a plurality of ground heights and a first set of tile indices;
  selecting a first lane segment of a plurality of lane segments based on a cost score for each respective lane segment of the plurality of lane segments, wherein the plurality of lane segments is based on a vector map corresponding the second position of the second detected object, and wherein the cost score for each respective lane segment of the plurality of lane segments is based on the second position of the second detected object, a respective center of the respective lane segment, a direction of motion of the second detected object, and a lane orientation of the respective lane segment;
  comparing a second set of tile indices associated with the first lane segment with the first set of tile indices to determine whether the second set of tile indices matches the first set of tile indices; and
  one of:
    in response to determining that the second set of tile indices matches the first set of tile indices, selecting a first ground height of the plurality of ground heights associated with the second set of tile indices as the second height of the second detected object; or
    in response to determining that the second set of tile indices does not match the first set of tile indices, selecting a height of the autonomous vehicle as the second height of the second detected object.

* * * * *